(12) United States Patent
Nunes et al.

(10) Patent No.: US 10,931,478 B2
(45) Date of Patent: Feb. 23, 2021

(54) SYSTEM AND METHOD FOR DISTRIBUTED FLOW STATE P2P SETUP IN VIRTUAL NETWORKS

(71) Applicant: MIDO HOLDINGS LTD., Lausanne (CH)

(72) Inventors: Duarte Nunes, Barcelona (ES); Guillermo Ontanon, Barcelona (ES)

(73) Assignee: MIDO HOLDINGS LTD., Lausanne (CH)

(*) Notice: Subject to any disclaimer, the term of this patent is extended or adjusted under 35 U.S.C. 154(b) by 8 days.

(21) Appl. No.: 14/883,016

(22) Filed: Oct. 14, 2015

(65) Prior Publication Data

US 2016/0105471 A1 Apr. 14, 2016

Related U.S. Application Data

(60) Provisional application No. 62/063,905, filed on Oct. 14, 2014.

(51) Int. Cl.
*H04L 12/46* (2006.01)
*H04L 12/715* (2013.01)
(Continued)

(52) U.S. Cl.
CPC ...... *H04L 12/4641* (2013.01); *H04L 12/4633* (2013.01); *H04L 41/042* (2013.01);
(Continued)

(58) Field of Classification Search
CPC ...... H04L 45/72; H04L 45/02; H04L 12/4641
See application file for complete search history.

(56) References Cited

U.S. PATENT DOCUMENTS 9,736,085 B2 * 8/2017 Song ............... H04L 49/351
2002/0116512 A1 8/2002 Amit et al.
(Continued)

FOREIGN PATENT DOCUMENTS

| JP | 2016-504837 A | 2/2016 |
| WO | 2012 127886 A1 | 9/2012 |
| WO | 2014 085207 A1 | 6/2014 |

OTHER PUBLICATIONS

International Search Report and Written Opinion dated Feb. 4, 2016 for International Application No. PCT/US2015/055472; International Filing Date Oct. 14, 2015; pp. 1-17.
(Continued)

*Primary Examiner* — Tonia L Dollinger
*Assistant Examiner* — Joseph M Cousins
(74) *Attorney, Agent, or Firm* — Vorys, Sater, Seymour and Pease LLP; Rex W. Miller, II

(57) ABSTRACT

Systems and methods for virtual network implementation and management based on a peer-to-peer metadata exchange are disclosed. Metadata pertaining to a flow traversing a virtual network overlaying an underlying network is generated in accordance with actions executed to send data packets via the underlying network relative to the virtual network. The metadata is encapsulated in one or more control packets sent to a set of nodes of the underlying network. Each node of the set of nodes maintains a copy of the metadata received in the one or more control packets in a local data store. The metadata is accessed via the local data store when needed to process packets of the flow.

17 Claims, 10 Drawing Sheets

(51) Int. Cl.
*H04L 12/721* (2013.01)
*H04L 12/24* (2006.01)

(52) U.S. Cl.
CPC .............. *H04L 45/64* (2013.01); *H04L 45/38* (2013.01); *H04L 45/72* (2013.01)

(56) References Cited

U.S. PATENT DOCUMENTS

| | | |
|---|---|---|
| 2013/0346585 A1 | 12/2013 | Ueno |
| 2014/0195666 A1 | 7/2014 | Dumitriu et al. |
| 2014/0269288 A1 | 9/2014 | Crisan et al. |
| 2016/0156514 A1* | 6/2016 | Salonidis ................ H04L 45/48 709/223 |

OTHER PUBLICATIONS

Open Networking Foundation. OpenFlow Switch Specification—Version 1.3.4. Mar. 27, 2014. https://www.opennetworking.org/images/stories/downloads/sdn-resources/onf-specifications/openflow/openflow-switch-v1.3.4.pdf.

* cited by examiner

SYSTEM AND METHOD FOR DISTRIBUTED FLOW STATE P2P SETUP IN VIRTUAL NETWORKS

CROSS-REFERENCE TO RELATED APPLICATIONS

This application claims priority to U.S. Provisional Application Ser. No. 62/063,905, filed Oct. 14, 2014, entitled "System and Method for Distributed Flow State P2P Setup in Virtual Networks", the entirety of which is incorporated herein by reference.

BACKGROUND

1. Field

This application generally relates to networking and, in particular, to systems methods for overlaying a virtual network over a physical network. More specifically, this application relates to implementing an overlay network without dependence on a database storing a state.

2. Description of Related Art

The advent of cloud-based computing creates new demands for service providers. Service providers strive to provide each customer with a virtual network, decoupled from the physical network, along with an ability to add hosts and change a virtual topology. Network virtualization enables creation of customer-configurable network topologies, which can be altered by arranging virtual routers and virtual switches without any corresponding change in physical hardware. Virtualization further supports segregation of customers' data for security and use-based pricing.

Dedicated hardware can provide virtualization features, but at great cost. Other solutions exist that allow a virtual network to overlay an existing physical network while further allowing a topology of the virtual network to change independently of the underlying network. For instance, U.S. patent application Ser. No. 14/236,020 (hereinafter the "'020 application"), entitled "SYSTEM AND METHOD FOR IMPLEMENTING AND MANAGING VIRTUAL NETWORKS" and hereby incorporated by reference in its entirety, describes such a solution.

The '020 application discloses a system and method that facilitate packet routing using a virtual network overlaid on a physical network. The '020 application provides for flexible interconnection of network elements at multiple layers of the OSI model including L2 (Layer-2, i.e. Link Layer), L3 (Layer-3, i.e. Network Layer), and L4 (Layer-4, i.e. Transport Layer). Network elements may be interconnected with virtual L2 switches and L3 routers. The virtual L2 networks' packets may be transported over the existing L3 network using tunneling, without requiring any changes to the L3 network. Various tunneling methods may be used, such as GRE, Ethernet over IP, VXLan, MPLS over IP or CAPWAP. The Internet Protocol (IP) packets routed by the virtual L3 router may be transported over the existing L3 network, without requiring any changes to the existing L3 network. Data related to organization of network elements (virtual or physical), connection state, packet management, etc. can be stored in a shared database accessible by network nodes responsible for packet processing or handling.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a virtual network implementation and management based on a peer-to-peer metadata exchange is disclosed. Metadata pertaining to a flow traversing a virtual network overlaying an underlying network is generated in accordance with actions executed to send data packets via the underlying network relative to the virtual network. The metadata is encapsulated in one or more control packets sent to a set of nodes of the underlying network. Each node of the set of nodes maintains a copy of the metadata received in the one or more control packets in a local data store. The metadata is accessed via the local data store when needed to process packets of the flow.

These and other embodiments are described in more detail below.

BRIEF DESCRIPTION OF THE DRAWINGS

Various non-limiting embodiments are further described with reference the accompanying drawings in which.

DETAILED DESCRIPTION

General System Architecture and Operation

Figure 1:
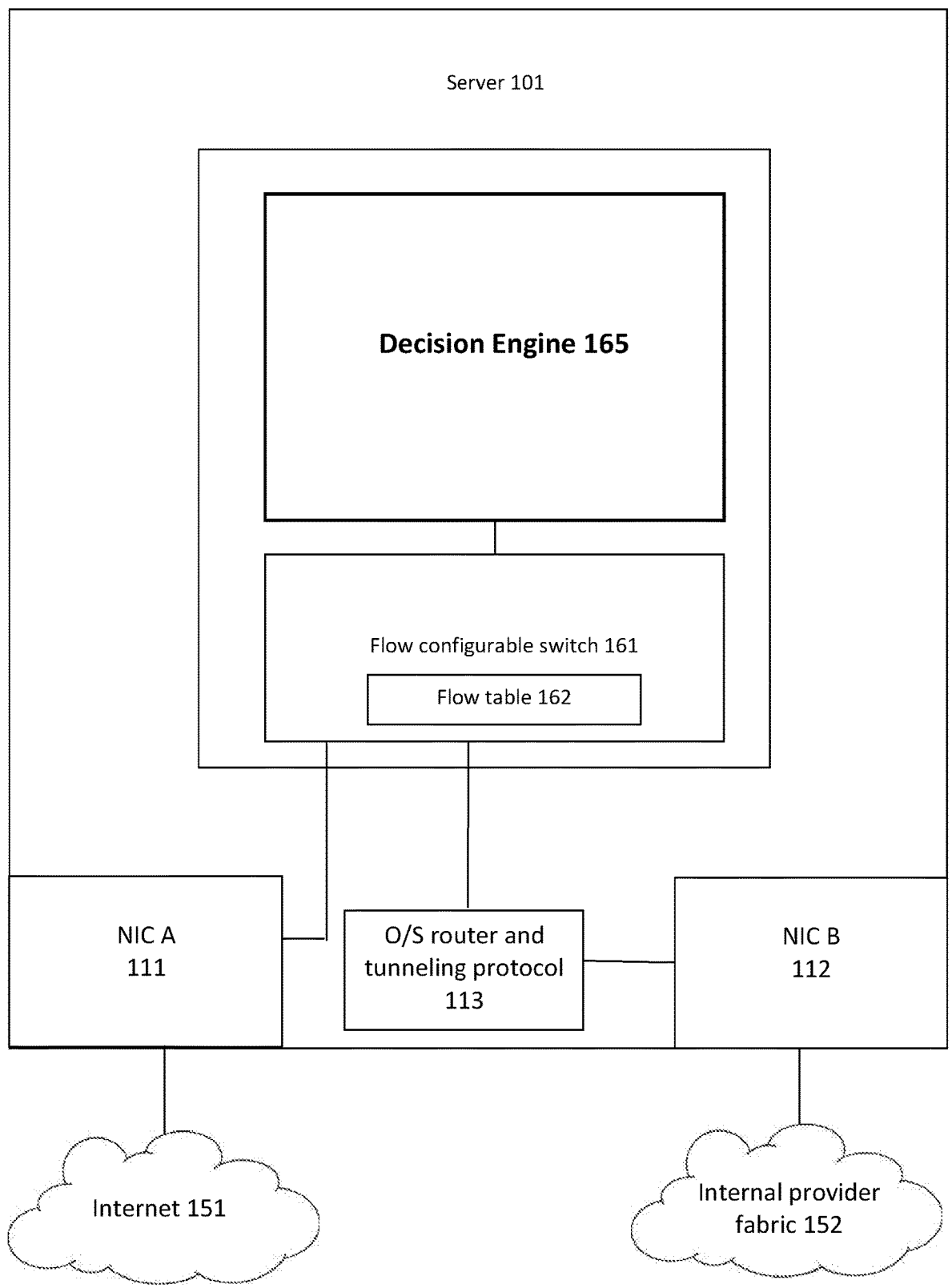
FIG. 1 illustrates an example of a server computer used by the system to route packets to and from a general network such as the internet to a service provider's IP fabric.

As discussed in the background, the '020 application provides computing systems that implement and manage virtual networks and may provide software defined network solutions. Specifically, a software abstraction layer is provided for virtualizing a network to improve effectiveness of cloud computing systems while reducing complexity of physical networks and associated maintenance costs. The computing systems and associated methods disclosed in the '020 application sets forth the general system architecture and operation on which one or more aspects of disclosed herein.

According to one example of the general system architecture, a packet can arrive at a first network interface of a first node of an underlying network (e.g., a network on which a virtual network overlays). The first network interface may be implemented in hardware or software on the first node. A decision engine may be invoked to determine how the packet will be handled. In one aspect, the packet and an identification of the network interface on which the packet arrived into the network are communicated to the decision engine to be processed. The decision engine may simulate how the packet will traverse a virtual network topology of the virtual network including each of a plurality of virtual network devices encountered by the packet. In addition to simulating how the packet is passed from one device to the next through the virtual network, the decision engine may also simulate how each of the virtual devices encountered affects the packet, such as by modifying the packet protocol headers. Based on the simulation results, the packet is processed by applying each of the determined modifications or an aggregation of the modifications so that the packet can be emitted from a network interface on one of the nodes of the underlying network. The specific network interface on which to emit the packet was determined during the simulation by the decision engine.

At each step through the virtual network topology, the decision engine determines how the packet may be handled by successive devices. In one example, the decision engine may determine that a packet is to be dropped or ignored. Dropping a packet may result when a given packet is associated with a communication or flow no longer being processed. A packet may also be dropped because a virtual device lacks sufficient instructions for handling a packet of a type received. Alternatively, a device may be unable to successfully route a given packet to a specified destination. An error message or other response may be provided to alert a sender of the packet that the packet did not reach the destination.

For many packets, the decision engine will determine that the packet should be emitted from a virtual port corresponding to a second network interface. The second network interface may be on the first node or on a second, different node of the underlying network depending upon the destination of the packet and a virtual port-to-host mapping. When the packet is to be delivered to the second network interface on the second node, the decision engine determines how the packet is to be processed and then the packet is delivered by the underlying network to the second node to be emitted by the second network interface. For instance, protocol headers of the packet may be modified before delivery to the second network interface. The modification of the protocol headers may provide for network address translation, tunneling, VPN and/or other features.

A map is maintained of node identifiers to node addresses for nodes on the underlying network. Node identifiers may be used to distinguish individual nodes for purposes of routing packets on the underlying network. To deliver a packet from a first node to a second node, the packet may be forwarded as the payload of a tunneling protocol packet (such as Ethernet+IP+GRE). The tunneling protocol packet has a tunnel key that encodes a global identifier of a second network interface. A global identifier may be unique within the network such that each network interface is uniquely identifiable. In contrast, a local identifier may be used within a node, or within a subset of the network to uniquely identify a port or interface within a subset of the network. When the tunneling protocol packet is received at the second node, the payload containing the original packet is extracted along with the tunnel key. The tunnel key may then be decoded to determine the second virtual network interface identifier and the packet emitted from the second network interface. In this manner, the decision engine is able to determine how a packet is to be handled as it traverses the virtual network and the underlying network is able to efficiently transport the packet once the determination is made.

The decision engine can also determine that a packet should be emitted from a set of network interfaces. Emitting from a set of network interfaces may be necessary in multicast or broadcast applications. The network interfaces from which the packet should be emitted may be local to a single node of the network, or may be dispersed across two or more nodes. In any case, the packet should be emitted from a set of network interfaces corresponding to an interface set identifier. The packet is then processed by delivering the packet to each network interface in the set that is local to the first node. The packet is also forwarded, with modifications, from the first node to the second node, over a tunnel. The packet may forwarded as the payload of a tunneling protocol packet using a tunnel key that encodes the interface set identifier. When the tunneling packet is received at the second node, the tunnel key may be decoded to determine the interface set identifier, and the packet emitted on any network interfaces included in that set that are local to the second node. The set of network interfaces associated with a given interface set identifiers may be stored in the shared database accessible by each node. Therefore if a node receives an unknown interface set identifier, the node may access the shared database to determine which network interfaces are included in the identified set. Moreover, a node may store or cache the mapping of network interfaces to interface set identifiers locally on the node. When the interface set identifier changes, however, the locally cached data is invalidated and the node may access the shared database to retrieve the current or updated mapping of interfaces to interface sets. A virtual network interface may belong to more than one interface set.

In another aspect, the decision engine determines how to handle a given packet based upon a simulation of that packet traversing the virtual network topology. In many applications, multiple packets are associated as a flow, where each packet in the flow is to be processed in the same manner. For example, all packets of one direction of a TCP connection should be processed in the same manner. Upon receiving a first packet of flow, the decision engine determines how the packet of that flow is to be handled. The decision engine may then store the actions or rules for handling subsequent packets of that flow. The stored actions or rules may be stored in the shared database such that the rules are available to all nodes for handling packets of a given flow. Alternatively the rules may be stored locally.

The output of the decision engine can include a packet protocol header pattern than can be used to match other packets for which the output of the decision engine would be the same as for the first packet. In other words, the packet protocol header pattern may be used to identify packets which will be treated in an identical manner by applying the actions or rules determined for the first packet. The output of the decision engine is the result of the simulation performed to determine how the packet is to be processed. The packet protocol header pattern and the result of the simulation for the first packet are stored. Upon receiving a second packet, the headers of the second packet are compared to the packet protocol header pattern while ignoring fields that change on a per packet basis such as TCP sequence number. If the second packet matches the pattern, then the second packet is deemed to be part of the same flow and the previously stored result of the simulation for the first packet is retrieved and applied to the second packet. The stored result of the simulation may be retrieved from the shared database, a local cache or any other memory suitable for holding the rules to be applied to packets of the flow. The decision engine may apply the flow the rules to the second and subsequent packets in a flow. However, the simulation associated with the first packet to determine the rules for the flow, and the application of those rules to packets may be divided to improve the speed or efficiency of the system.

The caching or storing of specific simulation results may be determined by the system. For example, the decision engine may hint at which simulation results should be cached. In this context a hint may include a recommendation that a specific result be stored subject to other consideration such as efficiency or available storage capacity. In one example, the system may elect not to store the simulation results for an infrequently used flow. The decision engine may also be informed about which outcomes or simulation results are actually cached or which results have been invalidated or evicted from the cached results. A cached result may be invalidated for a variety of reasons. In one example, an outcome may be evicted to free up storage space for new or more frequently used flows. The performance of the system may degrade as the number of stored flow rules increases therefore in some embodiments, the number of stored flow rules may be limited to increase efficiency and speed of operation.

Over time configuration of the virtual network topology and/or the virtual devices may change. This may cause previously performed simulation results to no longer reflect the proper rules to be applied to subsequent packets for one or more previously established flows. The system may therefore communicate between the shared database, the decision engine, and other components to detect and respond to changes in the cached simulation results. In one example, the decision engine may at any time ask that a specific cached entry be removed based on a change in configuration as reflected in the global state stored in the shared database. When a cached entry is removed, upon receipt of the next packet corresponding to the removed flow, the decision engine would be invoked and the simulation recalculated to determine how packets of that flow are to be processed. The reviewed simulation result could then be stored and applied to subsequent packets matching the packet protocol header pattern associated with the flow.

The system may determine the packet protocol header pattern for a given flow during the simulation of a packet. A packet can include a protocol header having a plurality of fields and the pattern is determined by identifying each of the fields that are read during the simulation by the decision engine. In this manner, each field read as the virtual network topology is traversed is identified, including field read by the plurality of virtual network devices. Each field that is read may be included as part of the pattern. In contrast, fields that are not read and therefore do not affect the handling the packet may be designated as wildcards.

In another example, a first packet is received on a second node of the underlying network and the second node generates a protocol header pattern that can be used to identify other packets having the same tunnel key as the first packet. The second node then uses the protocol header pattern to identify a second packet matching the packet protocol header pattern and emits the second (and subsequent) packets from the same local network interfaces from which the first packet was emitted. In this manner, the second node streamlines the process of determining on which ports to emit the second packet and improves the efficiency of the system. A flow programmable switch on the node may rely upon the protocol header pattern in combination with a tunnel key, or may rely only on the tunnel key to identify subsequent packets that will be treated similarly to a first packet.

While determining the simulation for a first packet, the decision engine may request that a base system generate one or more additional packets from a network interface or set of network interfaces. Additional packets may be required to determine the behavior of ports of the network. By requesting additional packets, the decision engine may gain additional information on portions of the network to assist in the simulation process. Each of the additional packets may be processed substantially as described herein, or may be provided with different treatment as necessary for the decision engine to develop the needed information about the network.

The system architecture disclosed herein can include a shared database accessible from an underlying network having a plurality of nodes. The shared database stores a virtual network topology and virtual device configurations for a plurality of virtual network devices. A network packet arrives at a first network interface of a first node of the underlying network. An action for processing the network packet is determined based on a simulation of the packet's traversal of the virtual network topology including the plurality of virtual network devices. The action is a flow rule operable in a flow programmable switch to process packets received at the node of the underlying network.

The decision engine described herein simulates the packet's traversal of the virtual network topology. The decision engine may be operable on each of the plurality of nodes to perform the simulation for packets received on each node. Alternatively, the decision engine may operate on a separate node in communication with each of the nodes that receives packets for which a simulation occurs.

The virtual network topology includes a plurality of virtual ports corresponding to the plurality of virtual network devices. Each virtual network device has one or more virtual ports. A virtual port may be either an exterior facing port associated with a network interface of a node of the underlying network, or an interior facing port associated with a virtual link between virtual network devices. A virtual link represents the logical connection of one virtual port to another virtual port and may also be referred to as a virtual cable.

The shared database stores the virtual network topology and virtual device configurations including the configuration of the virtual ports. The shared database may include one or more of a configuration for each of the plurality of virtual ports including an identification of the virtual port as one of an exterior port or an interior facing port, a configuration for each of the plurality of virtual network devices associated with the plurality of virtual ports, a mapping of network interface identifiers to identifiers of the underlying network nodes, a bi-directional mapping of exterior facing ports to corresponding network interfaces of underlying network nodes, and a mapping of each interior facing port of each device to the peer interior facing port of another device connected by a virtual link. As used herein, a peer interior facing port is the virtual port connected to a given virtual port by a logical connection. An interior facing port has a single peer, therefore each interior facing virtual port is the peer of the interior facing virtual port to which it is connected.

Virtual ports are configurable depending upon a desired organization of the virtual network, and a user may define the virtual ports accordingly. A packet ingressing/egressing an exterior facing virtual port is entering/exiting the virtual network. In contrast, a packet ingressing/egressing an interior facing virtual port remains in the virtual network. In this manner, a virtual port may be characterized as exterior or interior facing depending upon whether packet enter/exit the virtual network when passing through the port.

In an example, the decision engine operates locally on a first node and communicates with the shared database which contains the virtual network topology and device configurations. The shared database may contain an authoritative or master copy of the topology and device configuration information. To improve efficiency, at least a portion of the virtual network topology and virtual device configuration information may be cached locally on individual nodes. The cached data may be updated when the shared database is modified. In one embodiment, only those portions of the topology or device configuration used by a given node are cached on the node. Upon simulation of a packet's arrival at a virtual device, the system may load the configuration of the virtual device from the shared database to the node performing the simulation and may cache the device configuration for future use on the node.

The first network interface of the first node can be mapped to a corresponding virtual port. The configuration of the virtual port and the device associated with the virtual port can be retrieved from the shared database. The action for processing the network packet is then determined based upon a simulation of the device associated with the virtual port. The determined action may include one or more of: modifying an internal state of a network device, dropping the packet, modifying the packet's protocol headers, emitting the packet from one or more virtual ports of a network device, and emitting a different packet from one or more virtual ports of the network device. In emitting the packet from one or more virtual ports of the network device, the packet can be emitted from an exterior facing port or an interior facing port.

In determining how to process a packet, the decision engine may traverse multiple virtual devices connected by interior facing virtual ports. The decision engine determines a peer interior facing port for a second virtual port and retrieves the configuration of the peer interior facing port and the network device on which the peer interior facing port is located. The decision engine may then simulate the operation of the network device associated with the peer interior facing port to determine how the packet is to be processed. In this manner, the decision engine may simulate a route through the virtual network topology including any number of virtual network devices in order to determine how a given packet or flow is to be processed.

The simulation processes described herein are repeated until the decision engine has simulated the last virtual device traversed by the packet. The decision engine provides a simulation result or action to be applied to the packet and to subsequent packets matching a packet protocol header pattern. The simulation result or action includes an aggregate modification of the packet to modify the packet's protocol header to match the configuration of the headers as the packet would be emitted by the last virtual device, based on all modifications applied through the traversal of the virtual network topology. In this manner, the decision engine determines through the simulation the necessary modification to the packet so that packet may be efficiently modified and routed through the network.

As previously discussed, the packet includes a protocol header having a plurality of fields. The system determines a packet protocol header pattern used to identify packets for which a determined action or flow rule will be applied based on the simulation result. The system determines the packet protocol header pattern by identifying each of the field of the protocol header that were read during the simulation of the virtual network topology and the virtual network devices. In this manner, the fields of the protocol header that are relied upon in traversing the network are identified so that the determined flow rule may be applied to packets that should be processed in the name manner. Those fields of the protocol header that are not relied upon may be treated as wildcards or otherwise excluded from consideration in the process of matching the protocol header of subsequent packets to the determined pattern. The packet protocol header pattern and the corresponding simulation result may be stored on the node. The pattern and corresponding simulation result are stored as flow rule for use in a flow configurable switch configured to process subsequent packets arriving at the node. When a packet arrives at a node for which a flow rule has not been created, the decision engine is invoked to perform a simulation for the packet.

The simulation result produced by the decision engine may be dependent upon the virtual network topology and the virtual device configurations for virtual devices traversed during the simulation. When the topology or device configurations change, previously determined simulation results and corresponding actions to be applied packets may no longer be correct. To accommodate such changes, the system is configured to invalidate a stored packet protocol header pattern and the corresponding stored simulation result upon a change in the virtual network topology or virtual device configurations. The system invalidates all stored patterns and simulation results upon detecting a change. In other examples, only those stored results that relied upon the changed virtual device are invalidated. For instance, the set of virtual devices traversed during the simulation is determined during the simulation by the decision engine. The set of virtual devices traversed is then associated with the packet protocol header and/or the simulation result. When a change in the configuration of a virtual device is detected, the stored simulation results associated with any traversed set containing the changed virtual device may be invalidated. In this manner, the system efficiently determined which flow rules should be invalidated based upon a given virtual device change.

According to other examples, flows may be invalidated or evicted when the cache is a space limited resource. For instance, the system may locally (on the first node) track all the decision engine's that are cached by the underlying system, track a 'last matched' time of a decision which is the last time a packet matched a pattern and associated actions were applied. The system may then query the 'last matched' time of all decisions and evicting those decisions that have not been used in the longest time. Querying the last matched time may be performed at a specified frequency or may be performed as needed to maintain the size of the cache of stored decisions below a specified size. The system may also remove random decisions that were 'recently' created. Removing recently created random decisions may be efficient when a majority of recent decisions are for short-lived packet flows (compared to older surviving decisions that have a comparatively higher percentage of long-lived flows). The processes for invalidating flows may be used individually or in combination to manage the cache of data stored on the node within desired parameters. The system may also adjust the rate of invalidations or evictions based on the rate of new invocations of the decision engine, which correlate to the addition of new decisions to the stored cache.

In operation, the general system architecture described herein is configured to perform a method that includes simulating ingress and egress filters of a virtual device, where the filters include individual filtering rules that are organized into lists that may reference each other via jump rules. The method may also include specifying a condition that may read and apply logic to any or all fields of a packet's L2-L4 network protocol headers, and specifying an action to be executed (e.g. DROP, ACCEPT for further processing) when a packet matches the condition.

The method further includes maintaining the filtering rules for each device's ingress/egress filter in the shared database, maintaining a local copy of a device's filtering rules on any node that has recently simulated the device, updating the local copy of a device's filtering rules when the authoritative copy of the rules changes in the shared database, and/or re-validating locally cached flow forwarding decisions that required simulation of a device, when that device's filters are modified. The method may also include simulating filtering rules that match on per-flow connection-state, where per-flow connection-state is tracked independently by each simulated device, and where the set of connection-state values depends on the transport (L4) protocol of the packet.

Further, the general system architecture is configured to perform a method that includes having dedicated space in the central database for storing per-device-and-flow connection state and, upon beginning the simulation of a device, querying the central database using the packet's flow signature to retrieve the connection-state. The flow signature is computed by appending these fields in this order: the device ID of the simulated device, the packet's L3 header's (e.g. IP) source field, L3 destination field, L4 protocol type (e.g. TCP), L4 header's source field, L4 header destination field. If no connection-state is found in the central database, then the packet constitutes a new flow whose connection-state is implicitly the 'start' value of the set of states for this packet's network protocol. The method may also expose the connection-state value for matching by this device's filtering rules. Before ending the simulation of the device, and if the simulation determines that the device would forward the packet, the connection state is set for this packet's flow signature and this packet's return flow signature according to the transition rules for the set of connection-state values for this packet's network protocol. Similarly, the packet's return flow signature would be computed by appending these values in this order: the device ID of the simulated device, the packet's L3 header's destination field, L3 source field, L4 protocol type, L4 header destination field, and L4 header source field. The forward flow signature and return flow signature may also be defined using additional fields that may be useful in a given application. When the cached decision for the forward flow expires, the system may schedule the removal of both the connection-state associated with that flow and the return flow.

The method further includes simulating filtering rules that match on the packet's flow's connection-state, where per-flow connection-state is shared among all the simulated devices, and where the set of connection states depends on the transport (L4) protocol of the packet. In this manner, connection state is viewed as a property of the flow, independent of the path taken through the network of devices. The result is that all devices simulated in a single call to the decision engine will agree on the packet's flow's and return flow's connection-states; and any two devices simulated in two different calls to the decision engine will agree on those connection-states if at least one of the following is true: the return flow ingresses the virtual network at the same device from which the forward flow is emitted; the return flow packets have public, i.e. globally unique, L3 addresses. In embodiments, the shared database includes dedicated space for storing per-flow connection-state. Upon beginning the simulation of the packet's traversal of the virtual network, the shared database may be queried using the packet's flow signature. The flow signature may depend upon the device ID of the first simulated device if at least one of L3 source/destination are not public, i.e. globally unique. The flow signature may also depend upon the packet's L3 header's (e.g. IP) source field, L3 destination field, L4 protocol type (e.g. TCP), L4 header's source field, and L4 header destination field. If no connection-state is found in the central database, then the packet constitutes a new flow whose connection-state is implicitly the start value of the set of states for this packet's network protocol. The connection-state value for matching by any simulated device's filtering rules may then be exposed. Before ending the simulation of the packet's traversal of the virtual network, and if the simulation determines that the packet would finally be emitted from some virtual port, the connection state is set for this packet's flow signature and this packet's return flow signature according to the transition rules for the set of connection-state values for this packet's network protocol. The connection-state is written to the shared database before the packet is tunneled/forwarded (and hence before returning the decision) in order to avoid a race condition where a packet from the return flow is simulated and triggers a query to the connection-state before the connection-state write to the shared database has been completed. The packet's return flow signature may be computed in a similar manner. As noted above, when the cached decision for the forward flow expires, schedule removal of both the connection-state associated with that flow and the return flow.

In another aspect, the method includes reducing simulation time by avoiding querying or writing a connection-state when this state will not be used by the packet's simulation or by a return packet's simulation, by delaying querying the connection-state for the packet's flow until a filtering rule in some simulated device needs to read such state, determining whether the likely path for the return packet will include simulating a filtering rule that needs to read the return flow's connection-state, and in the negative case omitting the write of both forward and return flow connection-state to the shared database. The connection-state is kept in the shared database so that if any packets from the same flow arrive at an interface of a second node at a later time, the second node's decision engine will reach the same decision about how to treat that flow (in the absence of virtual network configuration changes). This is necessary to preserve the integrity of a flow when its packets arrive at the interfaces of more than one node of the underlying network because of external routing decisions. Those routing decisions may or may not be related to the perceived or real unreachability of a node's interface.

The general system architecture is further configured to perform a simulation of network (i.e. L3) and transport (i.e. L4) address translation for a virtual device. Similarly, reverse translations of the network and protocol addresses of a virtual device can also be simulated. These operations may be collectively referred to as "Network Address Translation" or "NAT." According to examples, individual NAT rules may follow or precede or be interspersed with filtering rules, specify a condition that may read and apply logic to any or all fields of a packet's L2-L4 network protocol headers, specify how the L3 and L4 fields should be translated or reverse translated when a packet matches the condition, and/or specify an action to be executed when translation has occurred (e.g. ACCEPT for further processing by the device, CONTINUE processing in the rule-set). The translation rules for each device's ingress/egress filter can be maintained in the shared database and locally copied on any node that has recently simulated the device. The local copy can be updated when the authoritative copy of the rules changes in the shared database.

During the simulation of the device, if the packet processing reaches the NAT rule, it can be determined whether the packet (possibly already modified by previous devices or rules) satisfies the rule's condition and, in the affirmative case, the packet is modified according to the translation or reverse-translation specified by the rule. Locally cached flow forwarding decisions requiring simulation of a device may then be revalidated when that device's translations are modified.

The general system architecture further implements a physically distributed virtual device that supports stateful destination NAT, in which some NAT rules allow a choice of translation target for L3 and L4 destination addresses and specify a policy for making the choice between translation targets. The system may store the translation choice for each forward flow in the shared database, keyed by both the forward and return-flow signatures. The forward flow signature may be composed of these values in this order: the virtual device's ID, the packet's L3 source address, L3 destination address, L4 protocol number, L4 source address, and L4 destination address. The return flow signature may be composed of these values in this order: the virtual device's ID, the L3 address chosen by the translation, the packet's L3 source address, L4 protocol number, the L4 address chosen by the translation, the packet's L4 source address. The stored translation may encode the packet's original L3 and L4 destination addresses as well as the L3 and L4 destination addresses chosen for the translation. During the simulation of a device, if the packet processing reaches such a NAT rule (that allows a choice of destination addresses) and satisfies the rule's condition, a key as described above is composed for the forward flow signature and the shared database is queried to determine whether a translation has already been stored (and hence the choice of translated addresses has already been made) by a previous decision engine execution (at the local or some remote underlying network node). If such a stored translation is found in the shared database, the packet's L3 and L4 destination addresses are modified to the chosen L3 and L4 addresses. If such a stored translation is not found in the shared database, then a choice is rendered according to the specified policy, the packet's L3 and L4 destination addresses are modified according to that choice, and the translation choice is stored in the shared database.

During the simulation of a device, if the packet processing reaches a reverse-translation rule that specifies reversing a choice, and the packet satisfies the rule's condition, then assuming that the packet is a return packet of a translated forward flow, the key that corresponds to the return-flow signature is generated. The shared database is queried to determine whether a translation has been stored for that return flow. The return flow signature may be composed of these values in this order: the virtual device's ID, the packet's L3 source address, L3 destination address, L4 protocol number, L4 destination address, and L4 source address. If such a stored translation is found in the database, then it is applied in reverse to the packet by modifying the packet's L3 and L4 source addresses to the stored translation's original L3 and L4 addresses. If such a stored translation is not found in the shared database, then the assumption that the packet is a return packet of a translated forward flow is incorrect, so no reverse translation need be applied. The simulation continues as if the reverse rule's condition had not been satisfied. In this manner, stores the translations in a shared database and handles race conditions such that the virtual device behaves correctly and indistinguishably from a correctly functioning hardware device. However, the virtual device has increased availability compared to a hardware device.

Similarly, some NAT rules allow a choice of translation targets for the L3 and L4 source addresses and specify a policy for making that choice. The system may store the translation choice for each forward flow in the shared database, keyed by both forward and return-flow signatures. The stored translation encodes the packet's original L3 and L4 source addresses as well as the L3 and L4 source addresses chosen for the translation. During the simulation of a device, if the packet processing reaches such a NAT rule (that allows a choice of source addresses) and satisfies the rule's condition, a key is composed as described above for the forward flow signature and querying the shared database to determine whether a translation has already been stored (and hence the choice of translated addresses has already been made) by a previous decision engine execution (at the local or some remote underlying network node). If such a stored translation is found in the shared database, then the packet's L3 and L4 source addresses are modified to the chosen L3 and L4 addresses. If such a stored translation is not found in the shared database, then a choice is made according to the specified policy, the return flow signature is built according to that choice, and the database is queried to make sure no translation is stored by that key. The choice and database check are repeated until the database returns no match for the key. The packet's L3 and L4 source fields are modified according to the final choice, the final translation choice is stored in the shared database, and the simulation continues. The check for the return flow key in the database may be used for correctness and to avoid ambiguity in routing return flows.

During the simulation of a device, if the packet processing reaches a reverse-translation rule that specifies reversing a choice, and the packet satisfies the rule's condition, then assuming that the packet is a return packet of a translated forward flow, a key is composed that corresponds to the return-flow signature, and the shared database is queried to determine whether a translation has been stored for that return flow. If such a stored translation is found in the database, then the stored translation is applied in reverse to this packet by modifying the packet's L3 and L4 destination addresses to the stored translation's original L3 and L4 addresses, and then the simulation is continued. If a stored translation is not found in the shared database, then the assumption that the packet is a return packet of a translated forward flow is incorrect, therefore no reverse translation need be applied, and therefore the simulation may be continued as if the reverse rule's condition had not been satisfied.

In yet another aspect, the number of attempts that select L3 and L4 address translations that are already in the database may be reduced by segmenting the L3 and L4 address ranges into blocks that can be reserved by individual nodes. When choosing L3 and L4 addresses for translation, a node locally checks whether there are unused address combinations in its own block, otherwise it reserves a new block. Often, this result in one round trip communication to the database. If the node cannot reserve a new block and has no unused L3 and L4 address combinations available for a new translation, then it attempts to use a random L3 and L4 address combination within the constraints specified by the rule.

The general system architecture described herein enables packet routing using a virtual network overlaid on an underlying network. The underlying network is a physical network, however, according to other embodiments, the underlying network may be a virtual or logical network. The underlying network may be described in terms of a physical network, however, one or more virtual networks may be layered upon another, each providing the underlying network for the next overlaid virtual network.

The architecture of the general system includes a network interconnecting a plurality of nodes. The nodes of the network may correspond to physical components such as servers, routers, or other computing devices in communication with the network. Each device may support one or more nodes. The nodes may represent logical or virtual devices. The network may be a private network maintained by a service provider, where the service provider sells, leases, or otherwise provides network capabilities to a plurality of tenants. The network may have one or more nodes, such as edge nodes, that provide connectivity to a public network. In one example, the network includes a plurality of Internet facing nodes providing multiple input/output communication pathways between the Internet and the network. The Internet facing nodes may be Internet connected routers. In another example, the network includes a plurality of nodes configured to host tenant virtual machines. The nodes hosting tenant virtual machines may be host servers or other devices with the necessary resources to operate one or more tenant virtual machines. In some implementations, a node may host multiple virtual machines from a single tenant. In another embodiment, a node may host multiple virtual machines owned by different tenants. In yet another embodiment, a node may operate both to host a tenant virtual machine and to provide Internet connectively to the network.

In operation, the system implements a method for routing a packet from a first node to a second node. The method includes receiving a packet at a first node of the network. The method further includes invoking a decision engine to simulate how the packet will traverse a virtual network. The simulation may include accessing a virtual routing table to determine a next hop for the packet, where the next hop is either an interior facing port (also referred to as a logical port) or an exterior facing port (also referred as a materialized port), and continuing to access subsequent virtual routing tables in series until the next hop is determined to be an exterior facing port on a second node of the network. After the decision engine has determined how to process the packet, the packet may be sent over the underlying network to the exterior facing port of the second node. The underlying network may be an Ethernet network, a private or public IP network, or other network providing connectivity between the plurality of nodes.

Each node of the network contains an edge connector. Each edge connector contains an instance of a flow configurable switch and decision engine running on the same physical host or node. In one embodiment, a flow configurable switch may comprise software such as Open vSwitch. The decision engine may simulate one or more virtual L2 switches and virtual L3 routers. An edge connector may have physical interfaces, virtual interfaces, or both. Virtual interfaces are interfaces such as, for example, tap interfaces or kernel level virtual interfaces. Physical interfaces are, for example, a physical network interface card (NIC).

A flow configurable switch is a software component that applies an action list to all packets that match a flow rule. Associated with an action list is a flow match that specifies what packets match the flow. In some embodiments, the flow match may be specified by a packet protocol header pattern. The flow match may be based on one or more portions of the packet data, including for example, the source and destination ports, source and destination addresses, MAC address. The flow match may also be based on combinations of packet data or subsets of packet data, such as a portion of the source or destination addresses. A flow rule may comprise at least a flow match and an action list, and may be referred to as a "flow." Two flows (one inbound, one outbound) form a connection. Generally, two flows, an inbound flow and an outbound flow, form a connection for communications between a client outside the network and a tenant's virtual machine or other provided service within the network. Each flow represented by one or more flow rules may be stored in a distributed state maintained in a shared database. In one embodiment, each flow is stored in a distributed state maintained on a node of the of the network accessible by all other nodes requiring access to the distributed state. The stored flows may be indexed by their flow match, or by other criteria associated with the flow rules.

In one embodiment, a flow table may be maintained that caches the routing decisions made for the first packet in one direction of a connection. The flow table is maintained inside the flow configurable switch. The network may have multiple possible access points to the external network, and connections need not use the same virtual route inbound as outbound. Allowing for different inbound and outbound routes may improve the fault tolerance of the system in the event of interruptions in certain portions of the network. Allowing for different inbound and outbound routes may also allow for improved utilization of network resources by balancing loads between different paths in the network.

The network may also contain forwarding elements that route and switch packets between the nodes of the network. The forwarding elements may be either L2 switches, L3 routers, or combinations of L2 switches and L3 routers. The forwarding elements may be either physical or virtual, and the network may include combinations of physical and virtual forwarding elements. A physical forwarding element is a hardware component, while a virtual forwarding element may be implemented in software. In one embodiment, a virtual forwarding element is implemented using tables. For example, the decision engine may be used to simulate the routing and switching of packets according to a virtual topology established for the network.

In the network, virtual routers may be connected to other virtual routers to construct a virtual network topology that may be illustrated by a virtual network graph. Each virtual router may have a plurality of virtual ports, where each virtual port is either an interior facing (logical) port or an exterior facing (materialized) port. For example, each virtual router may include a virtual routing table, and the interior facing ports may be identified by performing a lookup in the virtual routing table to determine the next hop for a packet being routed by the virtual router. Each lookup can lead to a peer interior facing port of another virtual router or an exterior facing port, allowing the decision engine to simulate the traversal of a virtual topology having multiple virtual routers.

In another embodiment, the edge connectors may have tunnel ports that are not ports of the virtual routers. The tunnel port may be used to connect one edge connector to another edge connector across the network. For example, the flow configurable switch of one edge connector may be connected to the flow configurable switch of another edge connector by a tunnel port. A packet may arrive at one edge connector destined for a virtual machine at another edge connector. When a packet is destined for an exterior facing port on another edge connector, it is sent to that edge connector via a tunnel. A table may be maintained in a distributed state that maps ports to edge connectors and a table that maps edge connectors to tunnels. Thus an edge connector may determine through which tunnel to send a packet based on a selected (non-local) port. The mapping of exterior facing ports to edge connectors and of edge connectors to tunnels may be maintained on a separate node, and the edge connectors may communicate with the separate node to determine the appropriate tunnel for a packet.

In one embodiment, the edge connectors on each node have access to a distributed state, which may be stored in a shared database. The distributed state is maintained and shared by the edge connectors. The distributed state may contain, for example, the configuration tree and other data regarding the virtual and/or physical network topology. In one embodiment, a distributed state may be implemented using Zookeeper and memcache. In another embodiment, part of the distributed state is a configuration tree, but other structures such as hash tables and n-ary trees are contemplated. The configuration tree and other shared data may be accessed by the edge connectors as needed, such as by the decision engine.

As utilized herein, the term "client" is used herein to indicate an external network client, such as a web browser, that is trying to reach a server hosted within the system, for example, to access the services of a virtual machine. The term "tenant" is used to indicate a customer of the service provider. A tenant may have one or more virtual machines or other services operating on physical machines within the system, and may want to dynamically establish load balancing or network address translation ("NAT") rules between these virtual machines and the clients. As used herein, the terms "cache," "caching" or other variations refer to all forms of temporary data storage regardless of whether the data is stored in memory explicitly designated as a cache.

An overview of some features for an general system architecture suitable to overlay a virtual network on an underlying network has been presented above. The above noted features and embodiments will be described with reference to the drawings, wherein like reference numerals are used to refer to like elements throughout. Additional aspects that can be implemented with the general system architecture are thereafter described.

Turning now to FIG. 1, a node 101 (e.g., a server) is illustrated with two network interface cards, NIC A 111 and NIC B 112. For purposes of illustration some nodes may be designated as edge nodes facing internet clients, and providing internet connectivity to the network. Other nodes may be designated as host nodes configured to host tenant virtual machines or other services within the network. For purposes of illustration the edge nodes and host nodes may be shown with symmetric architectures, however, in various embodiments, a variety of architectures may be used for the various nodes in the system. Although illustrated in terms of internet facing edge nodes and virtual machine hosting nodes, the system may also contain intermediate nodes including, data storage devices and support servers desired to facilitate operation of the network. As shown in FIG. 1, NIC A 111 has a connection to the internet 151 and NIC B 112 has a connection to the internal provider fabric 152 (e.g., the underlying network). The internal provider fabric 152 may be a private IP network, or another network that provides IP connectivity between the nodes.

The system includes a software component implementing many of the features of the virtual network overlaid on the physical network. The software components, such as flow configurable switch 161 and decision engine 165, comprise computer-executable instructions that are executable by a computer processor to configure the processor to perform various functions encoded therein. To illustrate the operation of the software components, the actions following receipt of a packet are described for selected operations.

In one embodiment, a SYN packet is received to establish a TCP connection. The SYN packet is received from the Internet 151 on NIC A 111. Packets are received by the edge connector at the flow configurable switch 161 for switching. The flow configurable switch 161 attempts to identify a flow rule by matching data associated with the packet to the flow rules stored in the flow table 162. The matched data may include, for example, source and destination ports, network addresses, MAC addresses, or other data associated with the packet. The SYN packet is typically the first packet in a flow and therefore the flow configurable switch 161 does not find an entry corresponding to the first packet in the flow table 162. Upon not finding a corresponding entry in the flow table, the flow configurable switch 161 makes a function call to a decision engine 165 and communicates the packet to the decision engine. The packet may arrive on a port of the flow configurable switch, and the flow configurable switch may communicate the incoming port ID to the decision engine with the packet. Although the function of the flow programmable switch and decision engine are described separately for clarity, it will be apparent that the software components may be integrated as desired. Alternatively, each component may be partitioned or combined with other components provided that the functions of the component are maintained. In one embodiment, the decision engine communicates to the flow configurable switch 161 via the OpenFlow protocol and translates the incoming port ID of the flow configurable switch into a virtual port ID ("vport"). Alternatively, this mapping may be based on MAC address, or 802.1x credentials instead of incoming port ID. The rest of the packet's routing may be dependent upon its L3 information. The decision engine 165 has the logic to simulate the route of the packet through the virtual network topology. In one embodiment, only the first packet of a connection will cause a call to the decision engine, because, once the flow is created in the flow table 162 that flow may be applied to subsequent packets of the same flow.

To create a flow rule associated with a new flow, in one embodiment the decision engine builds an action list indicating how to process and forward the packet and inserts it as a flow rule in the flow table. Subsequent packets that match the criteria for that flow have the action list applied, which may include routing the packet to a given port. If the packet were meant for another edge connector running on another server, it may be routed to the other edge connector via a tunnel port. Tunnel ports may connect edge connectors or nodes on the underlying network and are used to forward packets between edge connectors. Instead, when a packet is meant for a virtual port on another edge connector, it is sent to that edge connector through a tunnel. The tunnel protocol is, in one embodiment GRE+IP. This tunneling protocol allows one flow configurable switch 161 on a server 101 to communicate via the internal provider fabric 152 with another flow configurable switch (not pictured) on another server (not pictured).

Figure 2:
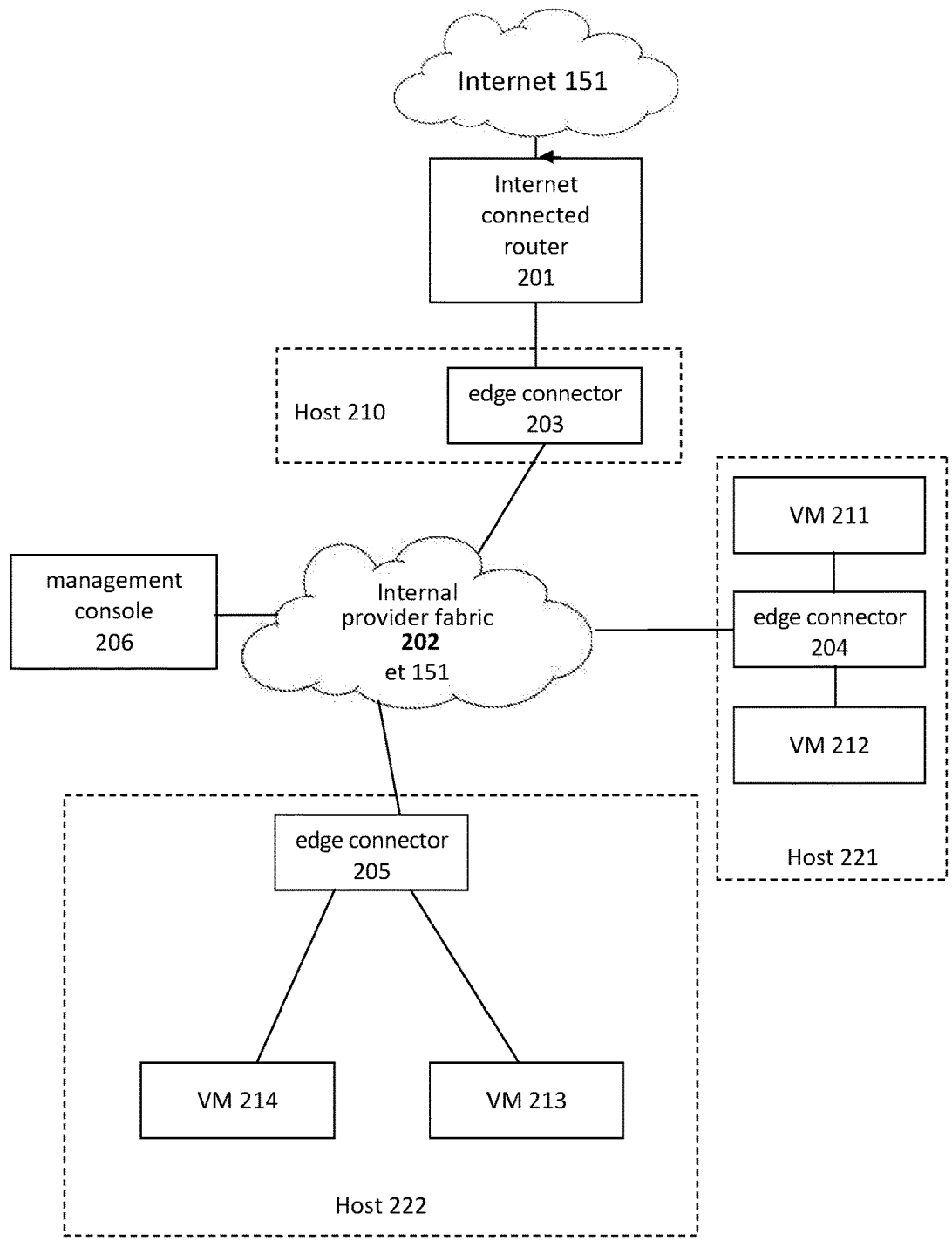
FIG. 2 illustrates an example physical network.

FIG. 2 illustrates the physical interconnection of a plurality of edge connectors 203, 204, 205 on a plurality of respective hosts 210, 221, 222 connected by the provider's internal L3 network fabric 202. For purposes of illustration, virtual machines 211 and 212 operate on host 221, while virtual machines 213 and 214 operate on host 222. A management console 206 may also be connected to the internal network fabric 202, which forms the underlying network.

Figure 3:
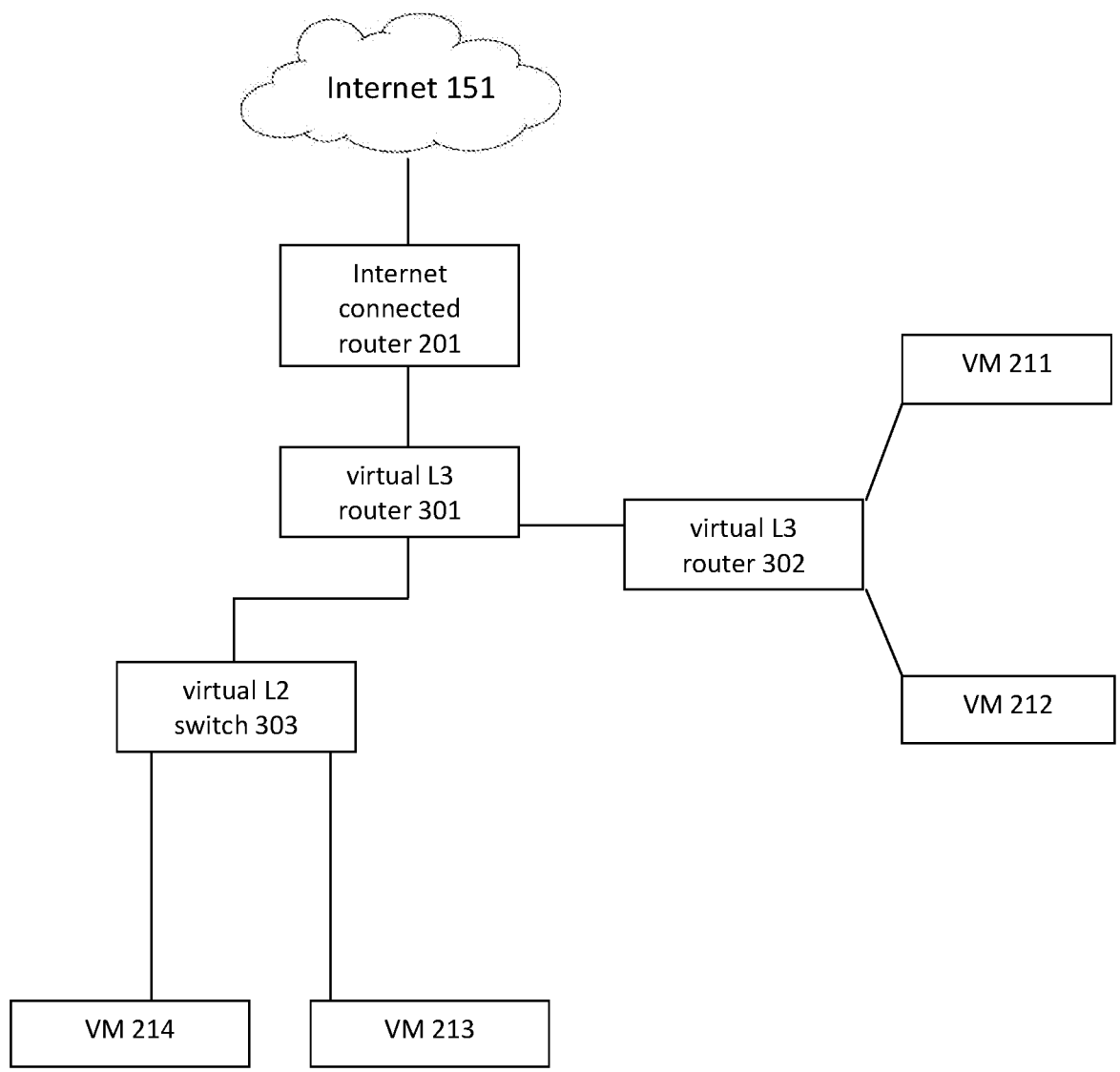
FIG. 3 illustrates an example virtual network that could be overlaid on the physical network of FIG. 2.

FIG. 3 illustrates the virtual topology that is overlaid on this physical network. The tunneling protocol allows the fabric to route the packets between flow configurable switches without modification to the hardware in the provider fabric 152. Because the actual packets travel over IP (L3) as opposed to Ethernet (L2), the network is scalable and may be not limited by distance limitations applicable to Ethernet communications. The end points of tunnels are ports in the flow configurable switches of the edge connectors, but tunnel ports are treated differently than exterior facing ports. The IP portion of the tunnel packet header allows the packet to get to the correct host, and then the GRE portion of the header serves to get the packet to the right tunnel port. Yet another key in the header serves to identify the destination exterior facing port, so that the receiving edge connector can route the packet to the correct local port.

Referring back to FIG. 2, a network comprising three edge connectors 203, 204, and 205 is illustrated, where each edge connector resides on a host. In an aspect, each edge connector can be similar to node 101 described above with respect to FIG. 1. Continuing with the example from above, assume a packet was received at edge connector 203 on a physical network interface card (NIC) from the internet 151 via the internet connected router 201 and that the packet is destined for virtual machine 211. Recall that the packet is the first packet of a flow, so there is no flow rule corresponding to the packet in the flow table. Because there is no corresponding flow entry in the flow table, the decision engine is invoked. The decision engine determines a virtual port (vport) based on the port that the packet was received on by the flow configurable switch, and possibly by the MAC address, and 802.1x credentials. The vport in this instance is an external facing (materialized) port corresponding to a NIC and a port in the flow configurable switch. The decision engine uses the vport to determine to which virtual router or virtual switch the port is connected. As discussed above, a virtual router may be implemented by a table accessible to the decision engine and maintained in a distributed state. Once the decision engine determines what virtual router is connected to the exterior facing port, the decision engine selects a matching route by identifying the destination IP address in the corresponding virtual router table. In one embodiment, the decision engine may select one route from several routes, or several equal cost routes, using a load balancing algorithm.

In another embodiment, when the decision engine accesses a virtual router table to look up an IP address, pre-routing and post-routing processes may be applied. The pre-routing process may alter the packet, including the source and destination IP addresses and source and destination ports, to perform network address translation ("NAT"). The routing method may comprise extracting the source and destination IP addresses, looking up the IP addresses in a virtual routing table corresponding to a virtual router, selecting a destination (if more than one route is found), and forwarding the packet to the port corresponding to the route entry. The forwarding of the packet depends on whether the next hop of the matching route is an interior facing (logical) port or an exterior facing (materialized) port. Since virtual routers may be implemented as tables, routing between two virtual routers comprises a lookup in successive virtual router tables. In one embodiment, a global routing table is maintained for each virtual L3 router. The global routing table may be stored on in a distributed state in the shared database. Alternatively, the global routing table may be stored on a selected edge connector. In another embodiment, the global routing table is maintained on each edge connector and the edge connectors cooperate to maintain and update the global routing table on each other edge connector in the network.

Referring again to FIG. 3, a virtual topology is illustrated that may be overlaid on an underlying network, such as the physical network of FIG. 2. In one example, a packet may arrive on an exterior facing port associated with virtual L3 router 301 and its destination IP address is the IP address of VM 211. The decision engine may use the vport that the packet arrived on to determine what virtual router the vport is connected to, in this case virtual L3 router 301. In one embodiment, the virtual L3 router 301 may be a provider router, created and administered by the service provider operating the network. The decision engine may then utilize the IP address associated with the packet to determine an output port for the packet. If the output port is a local external facing port, then a flow is established in the flow configurable switch and the packet is routed to the local external facing port. If the external facing port is not local, the packet is routed out a tunnel port according to a vport to host table and a host to tunnel port table. If the port is an interior facing port of another router or switch, then the same lookup process is repeated until an exterior facing port is identified. To continue with FIG. 3, the lookup in the table of virtual router 301 may return an interior facing port corresponding to virtual router 302. After or in combination with the lookup, post-routing processes may be applied to the packet as desired. When the lookup returns an interior facing port corresponding to another virtual router, in this instance virtual L3 router 302, the decision engine may repeat the same process for virtual router 302. Virtual router 302 may be, for example, a virtual router created by a tenant to route traffic between the tenant's virtual machines, virtual machines 211 and 212. The tenant's virtual machines may be on the same host, or may be located on different hosts within the network. A tenant may lease network resources from the service provider to operate any number of virtual machines or other services within the capacity of the network subject to rules established by the service provider. The decision engine performs a simulation that may include any pre-routing associated with virtual L3 router 302, looking up the IP address in the virtual routing table to determine a next hop, and any post-routing. In this example, the next hop is virtual machine 211, which is hosted on a different edge connector than edge connector 203. The virtual router table for virtual router 302 provides a vport corresponding to VM 211 as configured by the tenant or the service provider. In one embodiment, the service provider may move tenant virtual machines between different nodes in the network to manage equipment utilization or to maintain operations during maintenance or repair of physical components in the network. The decision engine then looks up the physical location of the egress vport in a port location dictionary maintained in the distributed state. Because all packets forwarded by switches are L2 packets, there is space in the L2 packets for MAC addresses. Because tunnel ports are between two flow configurable switches, however, MAC addresses may not be necessary for certain applications. More specifically, in certain embodiments, there is no need to forward the actual MAC addresses because the egress edge connector can construct the MAC address based on its own local information, using ARP to determine the next hop MAC. Instead, the vport of the destination (in this case VM 211) is encoded into the space for the MAC address. The packet is then wrapped in GRE+IP with the IP address of the edge node as the destination. The packet is now ready to be routed via the L3 network.

Referring again to FIG. 1, an action list containing any pre- and post-routing and the routing destination may be installed in the flow table 162 to match all future packets of this flow and the packet may be sent out via the tunneling protocol and through the operating system router 113 and then to NIC B 112. The packet is, after it exits NIC B 112, routed over the internal provider fabric 152 as any other IP packet would be, with the destination IP address of edge connector 204.

When the packet is received by edge connector 204, it is received on a tunnel corresponding to a tunnel port of the flow configurable switch. Because the packet is received on a tunnel port, the edge connector may treat this packet differently than a packet coming in on an exterior facing port. The packet is again the first packet received on this flow and the edge connector 204 will invoke the decision engine. In one embodiment, the tunnel key encodes the destination vport id. The decision engine may use the vport id to determine a MAC address and the local port number of virtual machine 211. In some instances, the decision engine may initiate an ARP request to determine the MAC address of VM 211. Alternatively, the MAC address may be cached in an ARP table. An ARP table (IP to MAC) is maintained per port of a virtual router. The ARP table may be shared in distributed state stored in a shared database. After the decision engine has determined the vport of VM 211, the system may install a flow in the flow table to route future packets of this flow. The packet may then be routed to the port of the flow configurable switch corresponding to VM 211. Although VM 211 is a local virtual machine running on host 221, which also hosts edge connector 205, the decision engine may still use the destination IP address to find the destination MAC address. In this manner, the system abstracts whether the VM is local or a standard port to another router or switch further proving the flexibility of the system.

Once the flows have been established, subsequent inbound packets on the same connection will match the flows in the flow tables of edge connectors 203 and 204 and will be modified and forwarded by the flow configurable switches on those machines without invoking a decision engine. This process establishes the inbound flow of a connection through the system to the desired destination.

When VM 211 responds on the same connection, the first packet it sends will trigger the system to establish a corresponding flow in the opposition direction. When a new flow is established, the decision engine may access the distributed state to determine if a flow was previously established in the opposite direction. This distributed state facilitates implementation of other processes, such as NAT and also enables the system to cleanup terminated connections as described further below. In other embodiments, virtual machines hosted on different physical components may be connected to the same virtual router.

Figure 4:
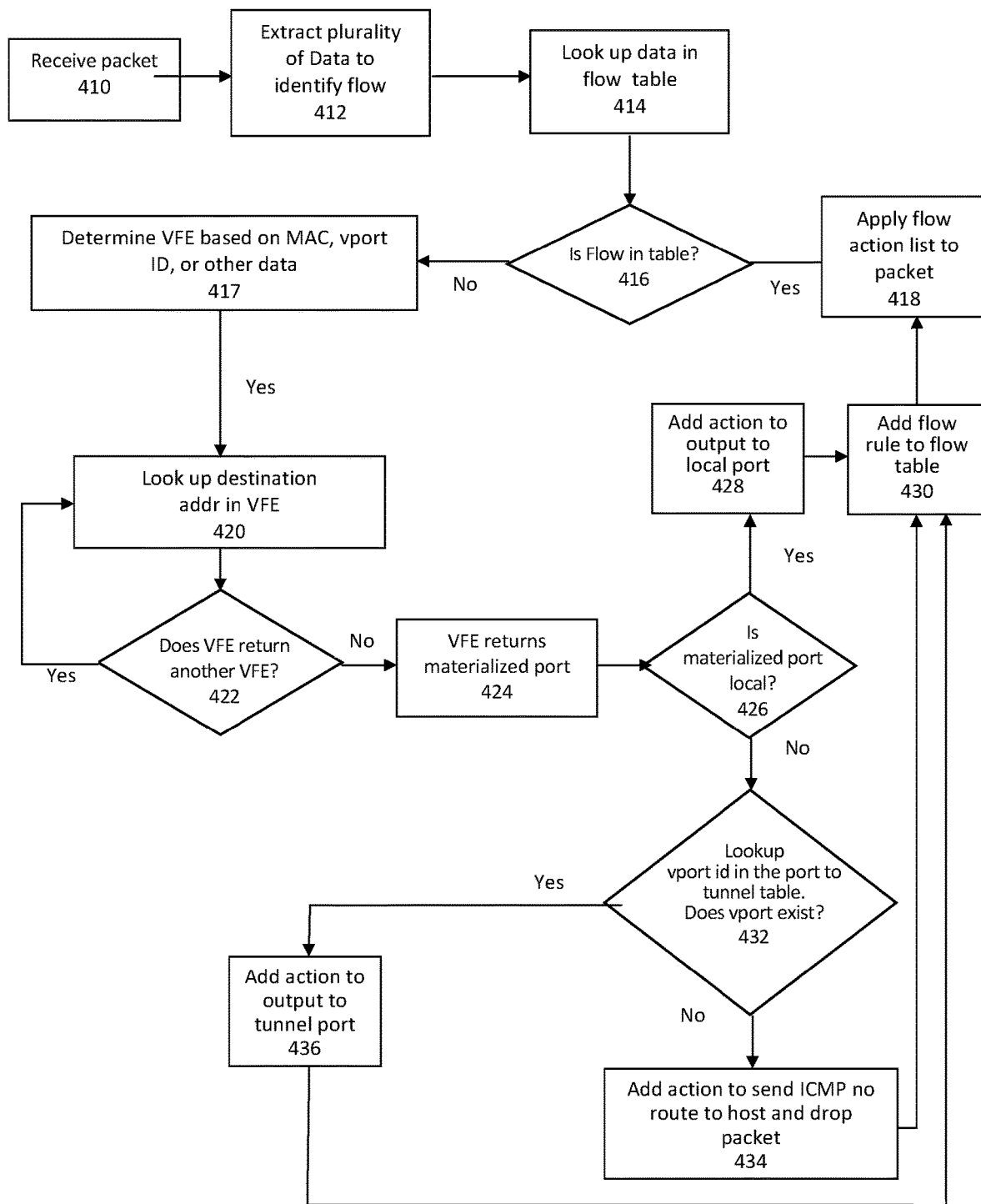
FIG. 4 illustrates a process running on an edge connector to route packets in a virtual topology comprised of virtual routers.

Referring now to FIG. 4, a high level overview of a process running on an edge connector performing an embodiment of a method described above is illustrated. In an embodiment, an edge connector runs on a physical machine with at least one CPU that receives packets from an external network, such as the Internet, where the packets are addressed to an IP address associated with a tenant of the system. The tenant IP addresses may be assigned to tenant virtual machines running on one or more hosts within the system. In one embodiment, the IP address associated with a tenant virtual machine may remain constant even though the tenant or service provider relocates the virtual machine to a different host within the system. In an embodiment, the system allows multiple tenants to share one service provider's uplink, by allowing multiple IP addresses on one uplink to be routed to different edge connectors and different tenant virtual machines. When the edge connector receives a packet at step 410, it extracts a plurality of data at step 412, including but not limited to, source and destination addresses and source and destination ports. After extracting the data, the edge connector looks up the plurality of data in a flow table (step 414) and determines if the flow has already been established (step 416). An example of a flow would be one direction of a TCP connection, with an inbound and outbound flow combining to form a single TCP connection. If the flow already exists, the flow action list is applied to the packet and the packet is forwarded to the port of the flow configurable switch indicated by the flow action list in step 418.

Figure 10:
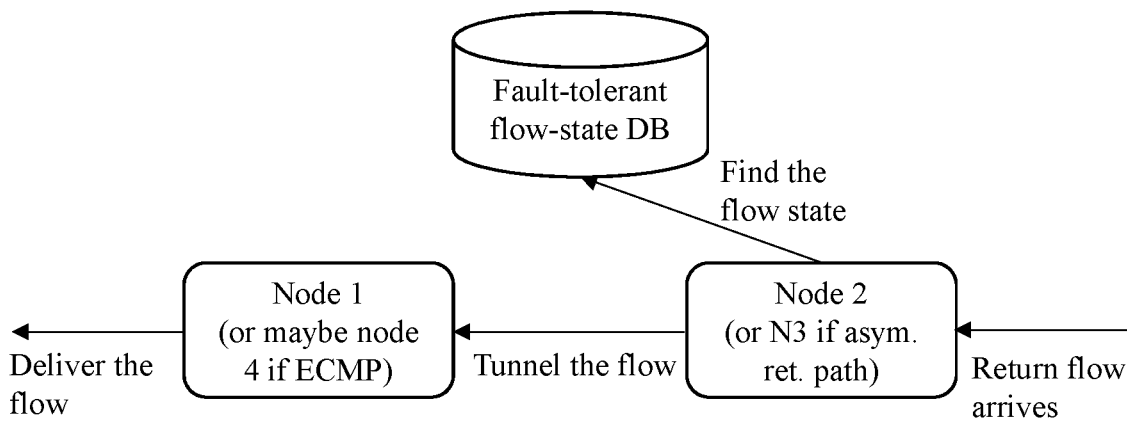
FIG. 10 illustrates a second aspect of flow state management with a shared database.

If the flow does not exist, this is the first packet in the flow received by the node, and the edge connector must determine in step 417 what virtual port the packet arrived on, based on, for example, MAC address, source and destination addresses, or source and destination ports. Once the edge connector determines the virtual port ID, the edge connector can determine to what virtual forwarding element that port is connected. In the embodiment of FIG. 10, the virtual forwarding element is a virtual router, but other virtual forwarding elements, such as virtual switches, may be utilized as necessary in the system as discussed below. Once the edge connector determines the VFE, the edge connector performs another lookup in step 420. The lookup is performed by looking up the destination IP address in a series of virtual forwarding elements. The virtual forwarding elements may comprise any combination of virtual routers and virtual switches including virtual routing tables to determine the appropriate path for the packet being forwarded. In the embodiment shown, in step 420, the decision engine determines the destination of the packet in a first virtual forwarding element. The first virtual forwarding element may be a virtual router, in which case the destination returned may be either an exterior facing port or an interior facing port. As noted above, an interior facing port is paired to another interior facing port of a second virtual router, and the second virtual router has another routing table. If an interior facing port is returned, the decision engine looks up the destination address in the routing table of the second virtual router in step 420 and continues until an exterior facing port is returned. In one embodiment, each tenant may have a single virtual router configured to route all packets handled by that tenant. In other embodiments, some tenants may have a plurality of virtual routers, virtual switches or other virtual forwarding elements defining the tenant's portion of the virtual network topology. The decision engine also builds a series of actions to be performed on the packet from each virtual routing table. Each routing step may also have pre-routing or post-routing processes that are added to the action list and incorporated into the flow rule to be applied to the packets matching the flow.

Once an exterior facing port has been returned (step 424), the edge connector determines if the exterior facing port is local (step 426). If the port is local, an action is added to the action list (step 428) to route the packet to the local exterior facing port. In various embodiments, the local exterior facing port may be a network interface card or virtual machine. The flow rule is then added to the flow table (step 430) and applied to the packet (step 418). If the exterior facing port is not local, then the port is on a different edge connector. In one embodiment, edge connectors may be connected by tunnel ports, such as GRE_IP tunnel ports. In step 432, the edge connector accesses a virtual port to tunnel table to attempt to map the exterior facing port to a tunnel port. If there is no corresponding entry in the virtual port to tunnel table mapping, an action to drop the packet and send an ICMP packet is added to the action list (step 434), the flow rule is added to the flow table (step 430), and the flow rule is applied to the packet (step 418).\

If the exterior facing port is in the exterior facing port to tunnel table, then an action to output the packet to that tunnel is added to the action list (step 436), the flow added to the flow table (step 430), and the action list applied to the packet (step 418).

In one embodiment, the system installs the action list and flow rule in the flow configurable switch datapath, and the flow configurable switch applies the action list to any subsequent packets that match the flow rule, as shown in step 416. As described above, part of the action list includes which port of the flow configurable switch the packet is to be sent on. The edge connector looks up the port in a port to host IP table, and sends the packet to the IP address. It then stores the action list in a flow table. All subsequent packets that have a matching plurality of data will have the same set of actions applied to them, resulting in them being routed to the same IP address.

During the process of identifying the destination address in the virtual routers, the flow may be unrouteable, black holed, or match a reject route, at which point the packet is dropped, or ICMP packets are returned. In this embodiment, a flow may be created to drop all packets that match the flow's rule. In this manner, the system may be configured to handle unrouteable packets or selectively screen undesired data according to rules established by the service provider or tenant.

In yet another embodiment, an edge connector hosting tenant VMs may have multiple IP addresses and multiple NICs connected to the internal fabric network. In such a case, the internet facing edge connectors can select one of multiple paths to the VM hosting edge connector. Further, a VM hosting edge connector with multiple IP addresses may have a unique ID to identify the edge connector, and the decision engine routing flows may select one of the IP addresses of the VM hosting edge connector, for example using a load balancing algorithm or randomly.

Another embodiment of the system may use identifiers for the edge nodes other than IP addresses. For instance, the network fabric may be circuit based, such as multiprotocol label switching ("MPLS") or another custom OpenFlow controller with dedicated circuits between edge connectors.

In this embodiment, the circuits may replace the GRE tunnels between flow configurable switches on edge nodes.

In another embodiment, the system provides for pre-routing and post-routing stages before and after the routing stage. Pre-routing and post-routing may be utilized to implement network address translation (NAT), load balancing, or other L3/L4 features. In one embodiment, the pre-routing stage may change the flow's destination (as, for example, in network address translation) and the outbound routing may change the flow's source (again, as an example, network address translation). To coordinate the mappings performed by the forward and reverse flows composing a single connection, such as in a TCP connection, connection translations may be stored in the distributed state with a large timeout. These translations may also be cleaned up proactively when connection tracking detects a cleanly closed connection.

In one embodiment of the present system, NAT is implemented using pre-routing and post-routing transformations. On flow setup, the NAT pre-routing stage determines if there a flow was previously established in the opposite direction (inbound vs. outbound) in the distributed state and, if so, the previously created map is reversed for the new flow. Because the flow rules are stored in the distributed state system accessible by all nodes, upon creation of a new flow on a different node, it is possible to determine whether an opposite direction flow was previously created. If the opposite direction flow is not in the distributed state, the decision engine creates a new translation and stores its translation map in the distributed state associated with the new flow. For the inbound flow, or alternatively the first flow established, the address translation may be applied to the destination address before the routing step and the routing step may route based on the translated IP address. On the outbound flow, or alternatively the second flow in the connection, NAT may be performed after the routing, to translate the source address to be the external, non-private IP address. The translation information may be stored in the distributed state associated with the flow rule prior to forwarding the initial packet of the flow such that the translation information is accessible when the initial packet of the reverse flow is received at the corresponding edge connector.

In another embodiment, destination network address translation (DNAT) may be used to translate from a publicly available IP address to a private network address to expose services hosted on a private network to the general internet. In some embodiments, a demilitarized zone (DMZ) may be provided between the general internet and the private network. In a DNAT process, the destination address may be translated during a pre-routing stage for the incoming flow, and in the corresponding outgoing flow, the source address may be translated during a post-routing stage. In one implementation, the destination address may be one of several possible servers, and the destination server may be selected by a load-balancing algorithm, such as a random algorithm or a round-robin algorithm.

In source network address translation (SNAT) multiple clients on the private LAN may share the same public IP address. A source address associated with outbound connections, such as connections from tenant virtual machines to an external network, may be translated to the same IP address in the outbound flow. In the corresponding inbound flow, a packet destination IP address may be translated to the corresponding private IP address based on, for example, port number and source IP address.

In another embodiment, the system may be configured to provide ARP spoofing for private local area networks. The system may permit single network hosts such as a virtual machine guest to be connected to a virtual router port without consuming gateway/broadcast addresses by impersonating other single hosts when the host ARPs for them. In a traditional Ethernet-based design, this would consume at least a /30 address range, including the guest's address, the gateway address, and the broadcast address, plus one unused address.

As one method of reducing the number of IP addresses consumed, each port of the router may be configured with a MAC address and network prefix (nw_prefix) and a flag indicating if there is a single host connected to the port. The gateway address used may be the first address in the nw_prefix range. If the single-host flag is unset, the router may handle traffic to and from the port according to its standard operating rules. If the single-host flag is set, the address portion of the nw_prefix specifies the address of that port's single network host. The router's downstream ports may be configured such that they comprise non-overlapping nw_prefixes with the single-host flag unset and ports with the single-host flag set, which may share identical address ranges specified by their nw_prefixes. In many embodiments, the address ranges used by the single-host and non-single-host ports will not overlap.

If an IP packet is sent between ports with the single-host flag set, the router may forward the IP packet without checking or decrementing the time to live ("TTL"), emulating an L2 switch. If an ARP request is received from a port with the single-host flag set for the address associated with another single-host port, the router responds to the ARP, impersonating the target. The result is that a single-host wanting to send traffic to a host outside what it considers its local segment will ARP for the gateway address, and the normal behavior of the router will return its port's MAC and the host will then send its IP packets. A single-host wanting to send traffic to a host it considers part of its local segment will ARP for that host directly. The router will respond to that ARP if it has a single-host port for that address, in which case the host will then send its IP packets. Behavior of hosts not on a single-host-flagged ports may be unchanged.

In another embodiment of the system, stateful connection tracking may be used to track the life cycle of connections, such that data associated with those connections may be cleaned up upon certain events, such as termination of the connection. The data to be cleaned up may include various connection state data, including data stored in the distributed state, such as stateful NAT and LB mappings, when the connection is cleanly shutdown. If a connection is not shutdown cleanly, for example if one side or the other crashes or is disconnected, then the connection state may be expired after a large configurable timeout. Connections may be TCP connections, and are composed of two flows, a forward flow, and a return flow. In the case of TCP, the system may simulate the TCP connection state machine in order to determine the connection state.

In yet another embodiment, the system provides for the return flow of a connection to be handled by a different node than the forward flow of the connection. A connection of this type may be referred to a split flow, characterized by the forward and reverse flow being handled by different decision engine. In one embodiment, the system supports split flows by having the decision engine seeing the forward and reverse flows communicate the closing of their respective sides. For example, the decision engine handling the FIN of the forward flow may notify the decision engine handling the return flow to install an action matching the FIN's ACK, or vice versa. The decision engines cooperate such that they may identify when both sides of a connection have been closed and are able to clean up the data associated with the closed connection. This communication among the decision engines may occur through the shared state in the distributed state system. Additionally, the distributed state system may identify certain conditions, such as the closing of both sides of a connection, and may communicate notifications to the decision engine handling each of the flows of the communication.

In another embodiment, when an edge node or edge connector handles the setup of a flow, either forward or reverse, which is part of a connection that should be tracked (based on whether it is a TCP connection, and whether stateful tracking is needed, e.g. if the connection is being NATed), the edge connector will add an action which checks for the TCP FIN bit and outputs the FIN packet. Upon receiving a FIN packet, the decision engine handling the reverse flow may install an action checking for the ACK of the FIN. When the ACK of the FIN is seen by the system, the connection is considered half-open, such that no data but only ACKs are expected. If data is received by a half-open connection, the system may generate an error indicating an unexpected condition was experienced by the system.

When a decision engine receives a new flow, it will install a rule which checks for the TCP FIN and RST flags. If the system receives an RST packet, it modifies the flow rule for the connection to have a short timeout, as the connection is going to be terminated once the peer receives the RST packet. If the system receives a FIN packet, it inserts into the action list of the return flow an action matching the acknowledged sequence number being the FIN packet's sequence number. If the system gets a packet acknowledging a FIN, it marks that side of the connection as closed. If both sides are closed, it modifies the flow rule for the connection to have a short timeout. In some instances, the FIN's ACK may be dropped, in which case the closing side will retransmit the FIN packet with the same sequence number. When the flow rules expire, the system identifies that the connection is closed and may cleanup additional state data such as NAT tracking.

Figure 5:
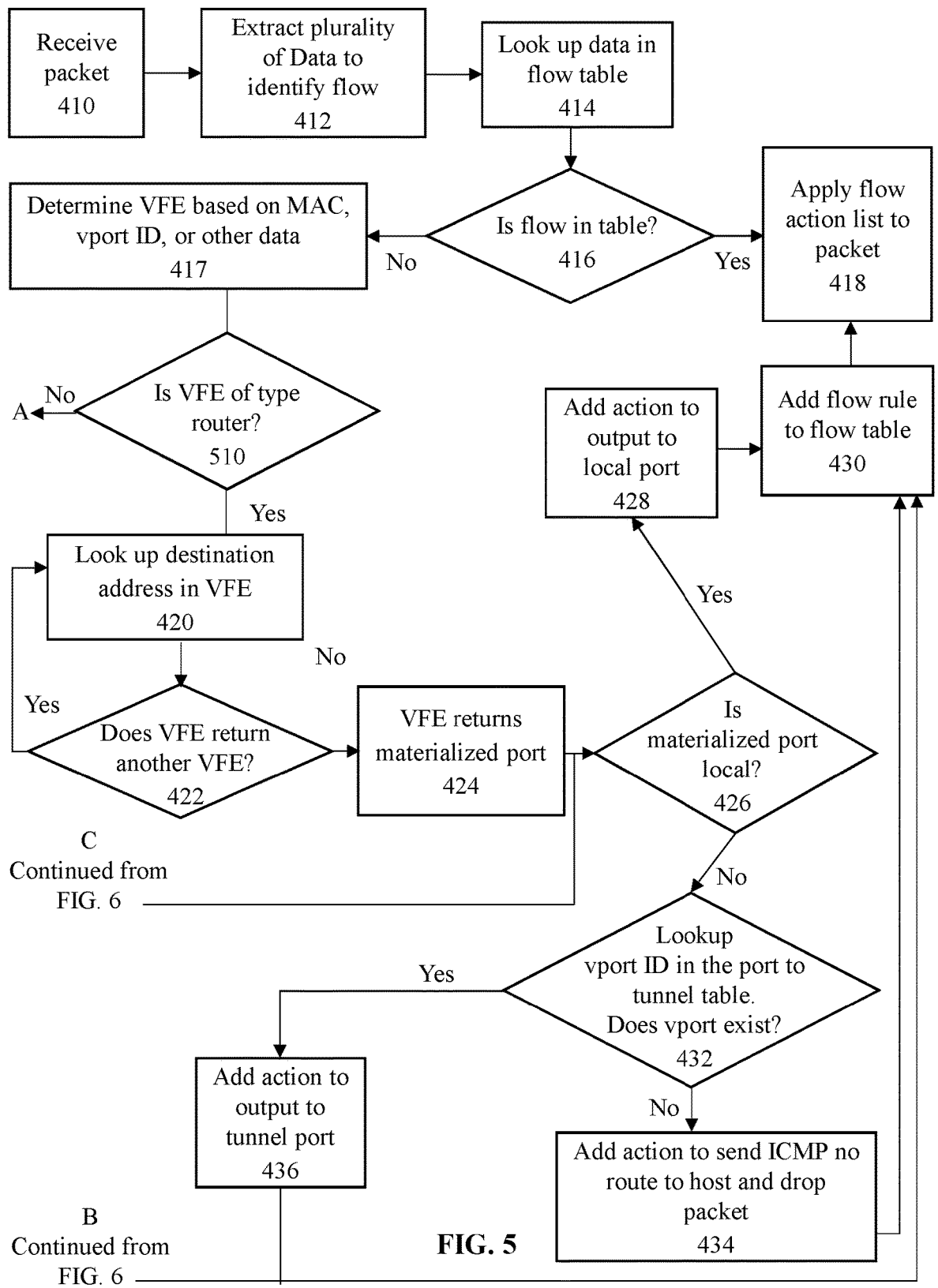
FIG. 5 illustrates a process running on an edge connector to switch and route packets in a virtual topology comprised of virtual routers and virtual switches.
Figure 6:
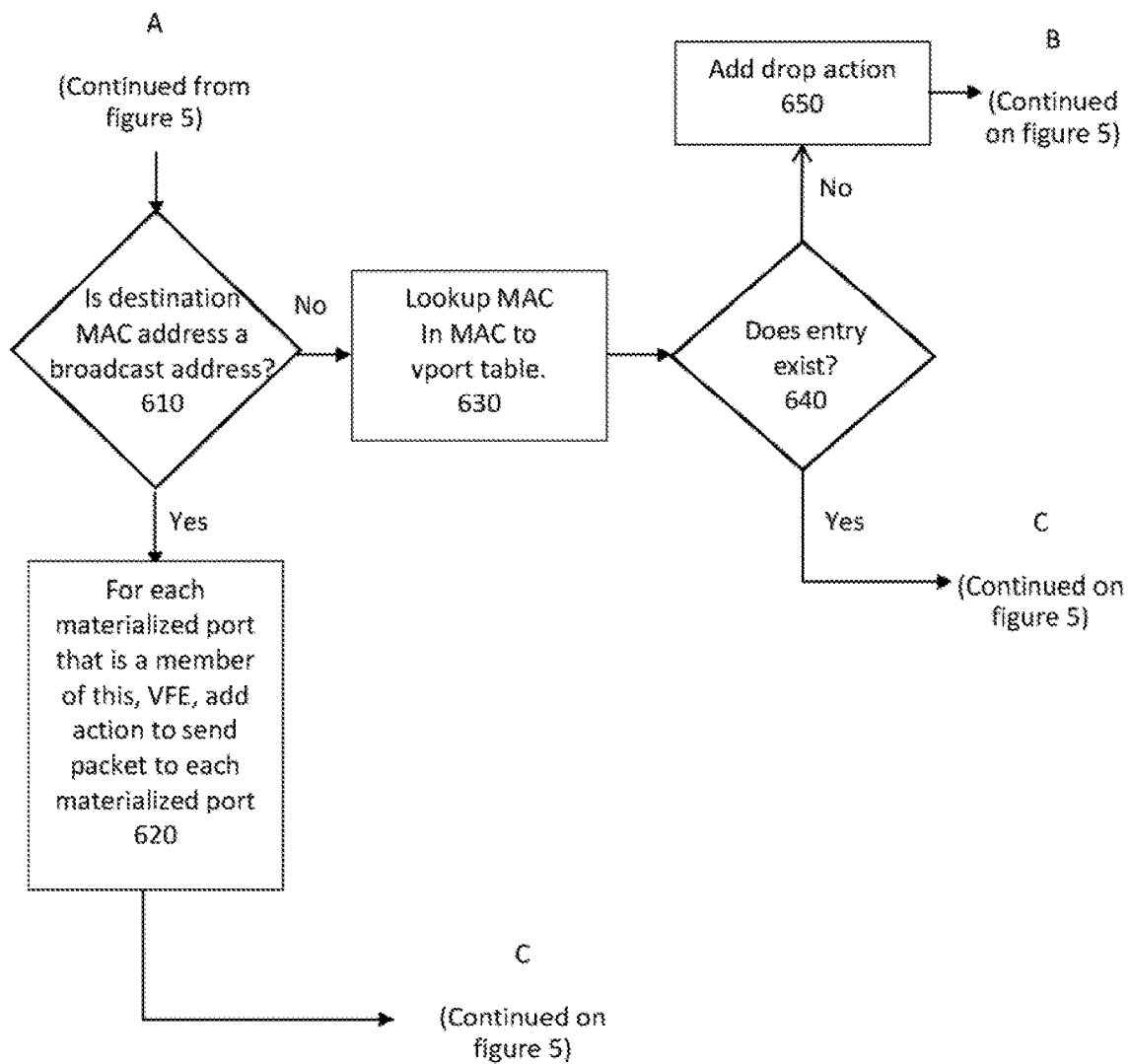
FIG. 6 is a continuation of the process of FIG. 5.

In another embodiment of the system and method presently disclosed, a virtual switch is provided as an additional virtual forwarding element. The system may transmit L2 packets between the edge connectors' ports that are part of each virtual L2 switch. In this manner the system may simulate the operation of a physical L2 switch transmitting packets between NICs connected to the physic switch. The system may also transmit packet L3 packets as described above using virtual routers. When setting up a flow, the incoming vport UUID is identified from the mapping of an ingress port or MAC address. Based on this vport UUID, the virtual device to which the vport belongs is determined Based on the type of virtual device (switch or router), the packet is either routed (as described above) or is switched. That is, if the packet is an L3 packet, it is handled in accordance with the virtual router process described above. Alternatively, the packet is an L2 packet and is processed by a virtual switch, as illustrated in FIGS. 5 and 6. The process illustrated in FIGS. 5 and 6 is substantially similar to the process illustrated in FIG. 4. After the VFE has been determined in step 417, the edge connector determines if the VFE is a virtual router or a virtual switch. If the VFE is a virtual router, processing continues as described with respect to FIG. 4. If the VFE is a virtual switch, processing continues at point A (520), connected to point A (520) in FIG. 6. As illustrated in FIG. 6, if the VFE is a virtual switch, then the edge connector determines if the destination MAC address is a broadcast address or a unicast MAC address (step 610). If the MAC address is a broadcast address, then the packet is sent to each port connected to the virtual switch (step 620). On a per packet basis, this step may be identical to the process of FIG. 4 starting with step 426. For each exterior facing port that is a member of the VFE, the packet is either sent to the local vport or the tunnel port corresponding to that exterior facing port.

If the packet is not a broadcast packet (e.g. a unicast packet), then the destination MAC is determined, for example, by looking up the destination MAC in a MAC to vport table (step 630). If there is not a corresponding entry (tested in step 640), then a drop action is added to the action list (step 650). Processing then continues at point B on FIG. 5, where the rule is added to the flow table (430) and the action applied to the packet (418).

If there is a corresponding vport in the MAC to vport table of step 640, then processing continues at point C on FIG. 5, processing continues at step 426, as previously described.

Figure 7:
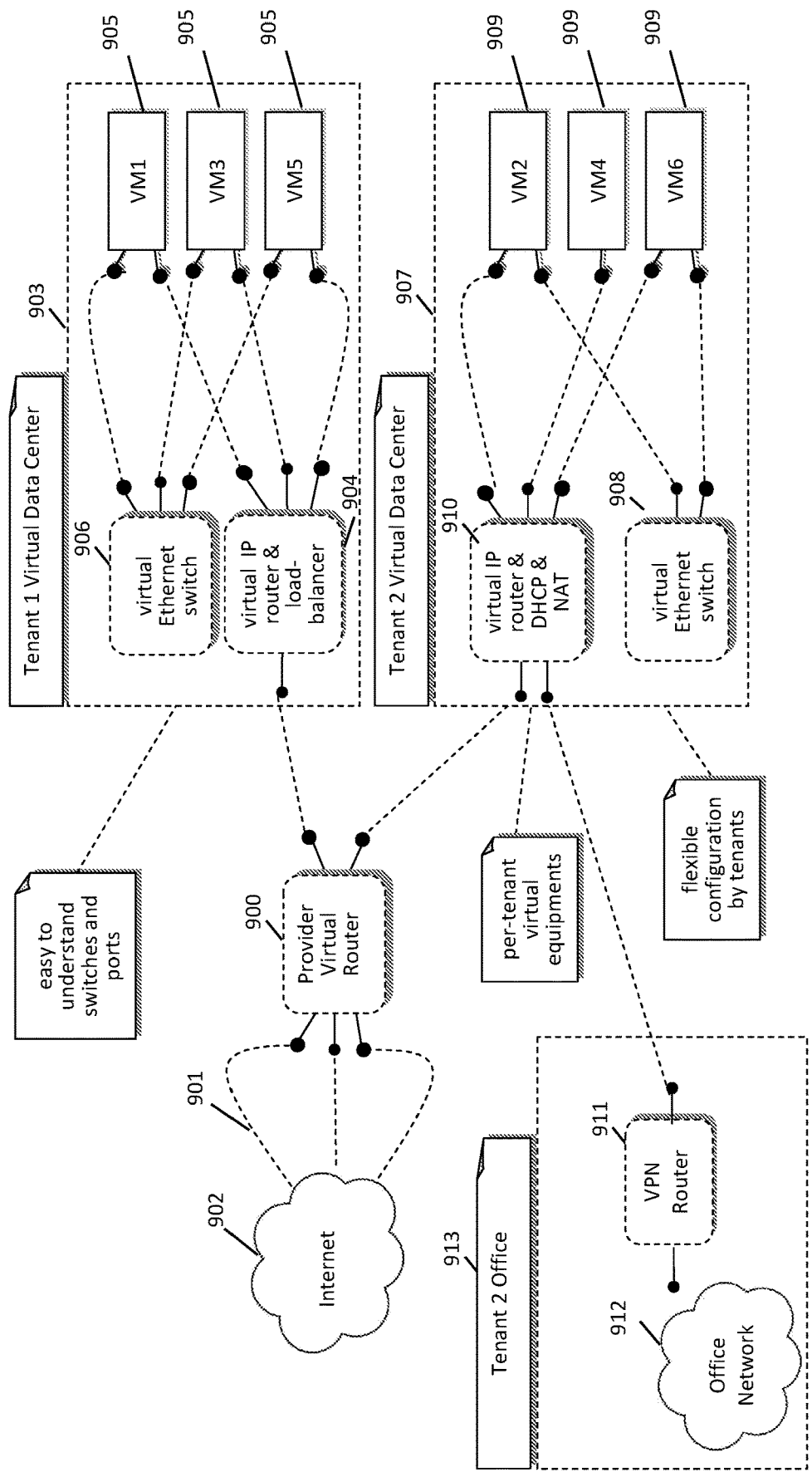
FIG. 7 illustrates an embodiment of a virtual network.
Figure 8:
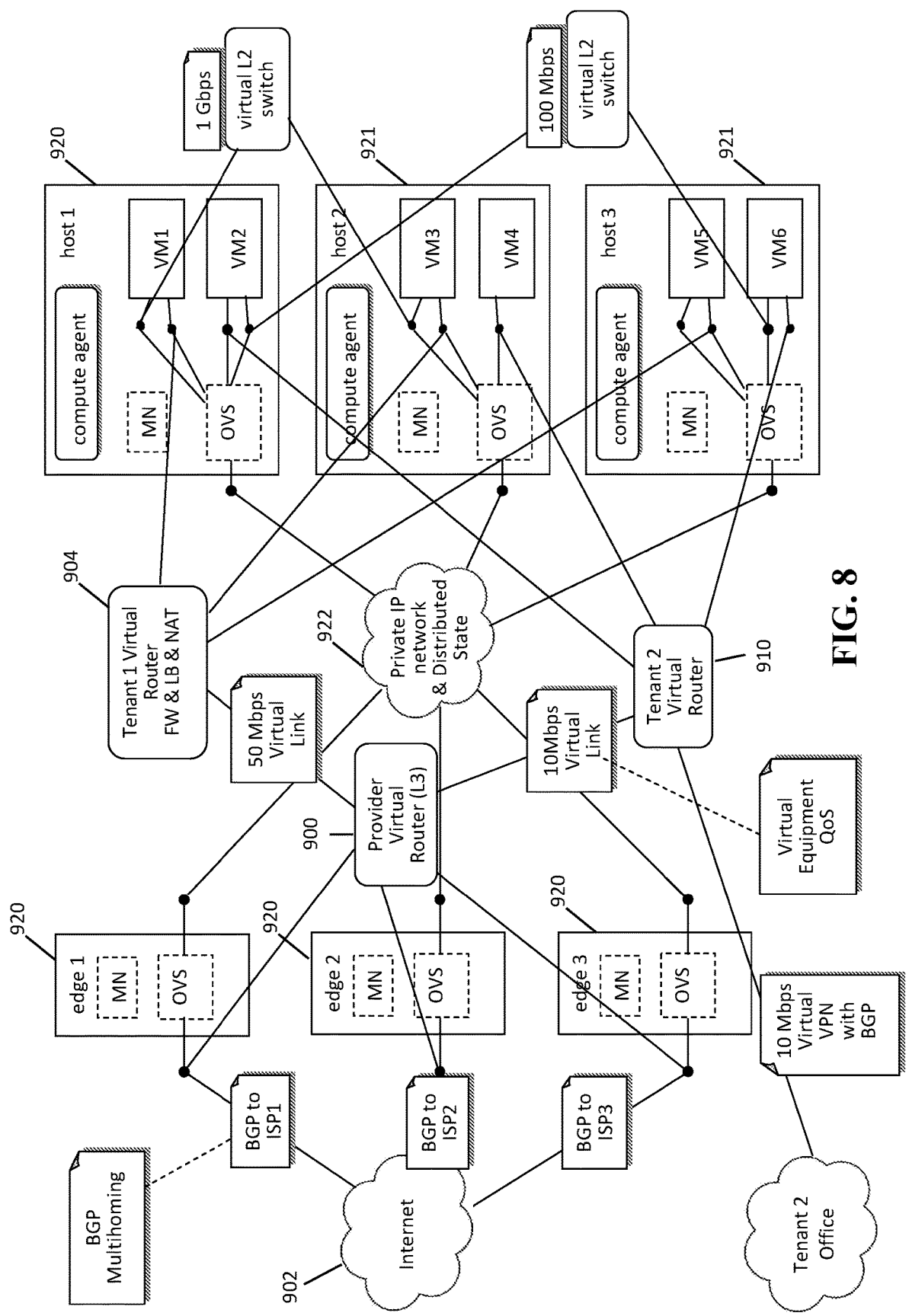
FIG. 8 illustrates the virtual network of FIG. 7 overlaid on a physical network.

Referring now to FIGS. 7 and 8, another embodiment of the system and method presently disclosed is illustrated. As shown in FIG. 7, a virtual network topology includes a provider virtual router 900 having multiple connections 901 to an external network, such as the general Internet 902. In this configuration the virtual network is provided with multiple communication paths to the external network allowing for flexibility and redundancy in the system. The provider virtual router 900 may have a plurality of exterior facing ports corresponding to a plurality of edge nodes, where an edge node is a physical component providing access to the external network. In one embodiment, an edge node may be an Internet facing router or server. The virtual network topology may also comprise a plurality of tenant virtual routers. In one configuration, each tenant virtual router may be associated with a tenant virtual data center. As shown in FIG. 7, a first tenant virtual data center 903 may include a first tenant virtual router 904 in communication with a plurality of first tenant virtual machines 905. The first tenant virtual machines 905 may also communicate with a tenant virtual switch 906, which may be a virtual Ethernet switch as illustrated. The first tenant virtual machines 905 may reside on one, or more than one servers or host nodes in the network.

As also shown in FIG. 7, the virtual network topology may have a second tenant virtual data center 907, including a second tenant virtual router 910 in communication with the provider virtual router 900 and a plurality of second tenant virtual machines 909. The plurality of second tenant virtual machines 909 may also communicate with a second tenant virtual switch 908, which may be a virtual Ethernet switch as illustrated.

The virtual routers may also perform additional functions such as load balancing, DHCP, and/or network address translation as desired by each tenant. Although only one virtual router is illustrated for each tenant, in other embodiments, a tenant may employ a plurality of virtual routers creating a tenant specific virtual network topology. A tenant specific virtual network topology may provide for organization of tenant virtual machines in desired arrangements or provide for isolation between virtual machines controlled by the same tenant, such as where a tenant is utilizing the network to host multiple discrete functions or business processes.

In another embodiment, a tenant virtual router may provide secure access to a remote tenant office or other location. As illustrated second tenant virtual router 910 provides for a connection to second tenant VPN router 911 and second tenant office network 912 at second tenant office 913. In this manner, each tenant may define the configuration of its virtual data center. A service provider utilizing the presently disclosed system and method may therefore provide many tenant customizable solutions on a physical network.

Referring now to FIG. 8, the virtual network topology illustrated in FIG. 7 is shown overlaid on a physical network. The physical network may comprise plurality of edge nodes 920 configured to access an external network, such as the Internet 902. The physical network may also include a plurality of host nodes 921 configured to host virtual machines. The network 922 may interconnect the plurality of edge nodes 920 and the plurality of host nodes 921 and be adapted to transport data packets throughout the system. In one embodiment, the network may be a private IP network. The edge nodes 920 and the host nodes 921 may have symmetric architectures. In one embodiment, the edge nodes 920 and host nodes 921 are general purpose servers configured to operate in a cloud computing system. In another embodiment, the edge nodes 920 are dedicated Internet facing routers. In yet another embodiment, a server or other computing device may function both as an edge node and a host node in the same network. The system also includes a distributed state system in communication with each of the edge nodes and each of the host nodes through the network. The distributed state system may store data associated with the virtual network topology and may be stored in a shared database. The system may include a software component operating on each of the nodes and implementing the virtual network topology including the provider virtual router and each of the tenant virtual routers. As new routes are configured, the software component operating on each of the nodes may communication with the distributed state system such that the distributed state maintains a comprehensive mapping of the virtual network topology and flow rules for the system. In other examples, the distributed state system may be subdivided such that multiple distributed states are maintained for selected portions of the virtual network.

As illustrated in FIG. 8, the virtual network topology is overlaid on the physical network. The provider virtual router may have an exterior facing port associated with each of the edge nodes 920. The exterior facing ports of the provider virtual router 900 may map to one or more access points for internet service providers and provide multiple connections between the system and an external network, such as the Internet. The provider virtual router 900 may also have interior ports defining virtual links to corresponding peer interior facing ports of tenant virtual routers. As illustrated, the throughput of each virtual link in the system may be selected. For example, the service provider may provide a 50 Mbps virtual link to the first tenant virtual router 904, but provide a 10 Mbps virtual link to the second tenant virtual router 910. As the virtual links are configurable, if the second tenant wishes to purchase a greater throughput for its virtual data center, the service provide may modify the available throughput without modifying hardware.

In the embodiment illustrated, each host node 920 is hosting one virtual machine associated with the first tenant and one virtual machine associated with the second tenant. Using the virtual network topology, the service provider may reallocate tenant virtual machines among available host nodes without reconfiguration the physical network hardware. The virtual network topology stored in the distributed state system allows the system to be dynamically reconfigured.

In another embodiment, each of the plurality of tenant virtual routers may be configured to expose at least one public IP address and may be configured to access an external network through one or more of the plurality of edge nodes. By enabling each tenant virtual data center to access the external network through a plurality of edge nodes, the failure of a single edge nodes is less likely to interrupt availability of the tenant's services operating in the network.

P2P Setup of Flow State in Virtual Networks

As described above, the general system architecture utilizes a shared database to store information supporting packet routing for a virtual network overlaid on an underlying network. As such, significant I/O overhead can be incurred.

To illustrate, Layer 4 load balancing can utilize a NAT implementation similar to that described above in connection with the general system architecture. In this implementation, NAT tables belong to a single virtual device to avoid collision between separate routers. A separate NAT table is utilized for each load balancer to further avoid collisions between load balancers and routers. Accordingly, when a new packet arrives at a router, the following steps occur:

1. If the router has an attached and active load balancer, check if the incoming packet matches any of the load balancer's active VIPs.
2. If the packet matches a VIP, get the pool for the VIP and check if we have pool members which are enabled (adminStateUp==true) and healthy (status==UP).
3. If we have an existing NAT entry for the packet's (src ip/src port) to this VIP, and the backend is still healthy, use this NAT entry.
4. Otherwise, choose one of the active pool members randomly, taking into account the weights of the active pool members.
5. Destination NAT the incoming traffic to the relevant backend (substitute the backend's IP and port into the destination IP/port fields of the packet).

According to an example where a backend is disabled, existing TCP connections to that backend can be allowed to complete. However, no new connections will be established with that backend. For instance, to implement this behavior, the existing NAT entry, in step 3, is respected if a backend is disabled (adminStateUp==false) but still healthy (status==UP).

Sticky source IP is implemented in a similar way to regular load balancing. The key for a regular NAT entry in the shared database (e.g., implemented with Cassandra or other suitable distributed database management system) looks like this:
<src ip>|<src port>|<dst port>|<dst port>
However, for sticky source IP, the client's source port is irrelevant as any incoming traffic from a single source IP to a VIP is sent to the same backend ip/port. Given this, a src port value of 0 (i.e. otherwise unused) is utilized for sticky source IP entries. Thus, the key for those entries becomes the following:
<src ip>|0|<dst port>|<dst port>
Implementing sticky source IP in this manner provides for a reduced number of trips to the shared database (e.g., Cassandra, but other systems are contemplated). While it is possible to keep one normal NAT entry for every new TCP connection (and separately keep track of the client IP→backend sticky mapping), this incurs an increased cost due to more queries to the shared database.

The load balancing flow when the VIP is marked as sticky (sessionPersistence==SOURCE_IP) is similar to that for regular load balancing. That is, if there is an existing NAT entry for the src IP (src ip/0) to this VIP, and the backend is still healthy and enabled, the existing NAT entry is utilized. Otherwise, an active pool member is chosen randomly, taking into account the weights of the active pool members. Destination NAT (DNAT) can be employed on the incoming traffic to the relevant backend such that the backend's IP and port is substituted into the destination IP/port fields of the packet. In this example, the key for NAT entry will be (src IP/0).

In an example, in sticky source IP mode, the existing NAT entry is not maintained if a backend is disabled (adminStateUp==false), but still healthy. Generally, sticky entries have a long timeout and, accordingly, may not timeout at the end of a current TCP connection.

When traffic flows back from the backend (pool member) via the load balancer, a reverse DNAT lookup is performed to replace the (src ip/src port) with the VIP ip/port. When looking up the reverse NAT entry for regular entries, (dest ip/dest port) is used as the key. For sticky source IP entries, (dest ip/0) is utilized as the key. If a load balancer has sticky VIPs only or regular VIPs only, only one lookup is performed. However, if a load balancer has both, two lookups are executed.

According to an aspect, each router has an inbound filter which applies a chain of rules to traffic entering the router, and an outbound filter which applies a chain of rules to traffic exiting the router. In a typical use case, the Source NAT rules are installed in these chains (for example, by an OpenStack plugin). Thus, if load balancing is utilized and filter rules are allowed to take effect, both DNAT and source NAT (SNAT) occur, which results in incorrect traffic routing. Accordingly, the inbound filter is skipped if load balancing (DNAT) takes effect and the outbound filter is skipped if reverse load balancing (reverse DNAT, i.e. return traffic from pool members) takes effect.

Layer 4 load balancing can operate in "Routed mode" such that the destination IP of the incoming packets is rewritten. This mode enables backend servers to see the client's real IP address and port as the source. In many other load balancing modes, backend servers see the load balancer's IP as the source IP. Thus, other mechanisms are employed to discover the original client IP (e.g. the HTTP X-Forwarded-For header).

Connection tracking and dynamic NAT (SNAT/L4LB) are features that correlate packets in a connection. A connection has packets traversing in opposite directions, meaning that different hosts are involved. As such, the state correlating packets is to be shared between those hosts. For example, in the general system architecture described above, the state is stored in the shared database. For instance, flow entries are written by a forward flow simulation and read by a return flow simulation.

In an aspect, the write during the forward flow simulation is done in an asynchronous, fire-and-forget fashion. By doing this, a possibility exists that the state is not yet in the shared database (e.g. Cassandra) when the return flow is being simulated. Thus, some packets from the return flow may be dropped, but this resembles normal behavior of a network. The reads performed during the return flow simulation also add to the simulation's latency. This inhibits a fully continuous simulation that is efficiently scheduled.

In view of this, the general system architecture described above can be modified such that all stateful L4 processing is performed without ever making a call off of the physical host. This results in user-visible latency and throughputs similar to those of L2, L3 or L4-stateless flows. As will be described in greater detail below, cluster components are removed from a packet processing fast path of a software agent on the host (e.g., node) and allows the agent to perform stateful processing while disconnected from the cluster. Accordingly, packet processing within the agent can be 100% synchronous and non-blocking.

To illustrate further, according to the general system architecture described above, NAT state and connection state are shared through an external system—namely, the shared database system. A call to the external system can be avoided by having a host simulating the forward flow (referred to herein as the ingressing host) tunnel this information to the egressing host before the packet causing the simulation of the flow is sent. The information can be sent in-band or via a control network. If there are two paths (a control path and a data path), there is some risk of the first data packet arriving prior to the control packet. However, for traffic directed at a VM, there is typically no underlay asymmetric routing. For traffic traversing gateway nodes, stateful port groups can be introduced. Thus, when stateful data is pushed to a host, the data is pushed to all hosts having ports that are members of the same stateful port group. In an exemplary deployment (such as an Openstack system), there may be just one such group which contains the gateway hosts.

For NAT translation, a data store may be used to hold the ports that are currently being used. However, calls to the external system can be avoid by having each host pre-reserve some amount of ports (e.g., based on the amount of VMs hosted on a compute node). Thus, round trips to the data store occur only for fetching or returning additional batches. Alternatively, as collisions are expected to be rare, a random port can be selected without coordination.

To deal with VM migration, some L4 metadata can be written to the shared database (e.g. Cassandra) asynchronously to the simulation path. This will ensure that when a host discovers a new port binding, it can query the shared database and seed the mappings associated with that port (which may be non-empty in the case of a VM migration). Additionally, the metadata can be extended to allow the new host to notify the ingressing host so as to invalidate any flow that would direct a forward flow to the old egress host.

The metadata messages described herein may be delivered using either a reliable or unreliable protocol. For a host-to-host exchanges, an ACK (acknowledgement) and retry policy can be introduced. For a port group multicast, periodic polling of the shared database can occur in addition to or as an alternative to a group communication protocols (i.e., gossip, etc.).

To further illustrate the improvements achieved with the peer-to-peer metadata exchange described above, the following is an exemplary comparison between the general process for the general system architecture previously and the process utilizing P2P metadata exchange for various scenarios.

In these hypotheticals, an exemplary, non-limiting embodiment of a network node and the processing performed thereby is described. The network node can be a computing device including a computer processor coupled to non-transitory, computer-readable storage media (e.g., random access memory (RAM), read-only memory (ROM), flash-based memory, magnetic-based memory (non-volatile: hard disks, other persistent storage media; volatile: MRAM, etc.), or substantially any other form of storage media capable of storage and retrieval of computer-readable data and instructions). The computer-readable storage media can store computer-executable instructions executable by the computer processor to configure the processor to perform the functions and actions described herein. For instance, the computer-readable storage media can store computer-executable instructions for at least an agent configured to process packets and route packets using the virtual network, a NAT lease manager module configured to select and manage port/address pairs packet translations, a packet context module configured to query and/or retrieve state information, and a coordinator module configured to store state information to shared database such as a distributed database management system (e.g., Cassandra or similar implementations). The computer-readable storage media can further store computer-readable data such as working data and metadata, state information, configuration information, and the like.

According to a first exemplary scenario involving dynamic source NAT, the general method performed by the general system architecture involves two write operations and one read operation to the shared database when an ingress host receives an incoming (forward) packet. Specifically, the general method performed involves receiving the packet at the host and routing the packet to the agent for processing. In this example, the agent determines the packet matches a NAT rule. Accordingly, the agent allocates a NAT entry with the NAT lease manger module. The NAT lease manager module selects a port/address believed to be free and available. To verify the port/address is free, the NAT lease manager module executes a lookup operation (e.g., a read operation) to the shared database. When free, the NAT lease manager module stores forward and reverse keys for the connection flow for subsequent packets belonging to the same flow. This results in two write operations to the shared database. In this simplified description of the process, packet handling is completed when the agent modifies the packet according to the forward key generated by the NAT lease manager module and routes the packet using the virtual network as described previously. So long as flows reference a key, the host will refresh periodically. For example, for an expiration time period of 60 seconds, the host may refresh every 30 seconds so longs as flows continue to reference the key.

For a corresponding reverse flow, the general process of the general system architecture commences when an egress host receives a return packet from a virtual machine (VM) hosted on the physical host associated with the egress host. The return process or reverse flow establishes the return tunnel that returns traffic of a connection (e.g., TCP connection) and results in two read operations to the shared database. The packet, upon receipt by the egress host, is routed to the agent executed by the computer processor of the egress host. The agent determines the packet matches a reverse NAT rule. Accordingly, a NAT reversal lookup is executed and performed by the NAT lease manager module. As the NAT entry for the forward direction was created and stored in the shared database, the NAT lease manager module discovers and retrieves this entry. In doing so, the NAT least manager module of the egress host performs a touch on the forward and reverse keys. Such a touch refreshes the keys (i.e., signals a reference to or a continued utilization by a flow). Thus, in retrieving the entry (e.g., retrieving the forward and reverse keys), two read operations are sent to the shared database. The agent reverses the NAT entry to process the packet. For example, whereas the agent of the ingress node modifies the destination address of a packet in the forward direction, the agent of the egress node modifies the source address in a corresponding, but inverse manner.

In a second exemplary scenario involving connection tracking, the general process performed by the general system architecture leveraging a shared database involves one read operation and one write operation for a packet in a forward direction. Specifically, a packet is received by the ingress host and routed to the agent executed thereon. The agent determines the packet matches a rule and the rule instructs the agent to perform a check as to whether the packet corresponds to a forward flow. The packet context module queries a connection tracking key in the shared database. In this example, the key is not found. The agent performs a forward flow simulation for the packet and the coordinator module write a new connection tracking key to the shared database.

For a return packet, one read operation is performed. In particular, a packet is received by an egress node and routed to the agent executing thereon. The agent determines the packet matches a rule that again requires connection tracking. The packet context modules queries the shared database for the connection tracking key and, in this situation, finds it.

To compare, the above scenarios will now be described in connection with utilizing P2P metadata exchange. As previously described, metadata exchange reduces dependence on a shared database and, thus, avoids costs associated with I/O. The examples described below are simplified to a situation having symmetric routing to better illustrate the comparison.

In the Dynamic SNAT scenario, processing a forward packet does not trigger any read or write operations to a shared database. That is, processing the forward packet does not pause to execute read/write operations as any ancillary calls to the shared database occur asynchronously and independently of packet processing. For example, a NAT lease manager module of an ingress node pre-reserves blocks of ports in the shared database in order to create a pool of mappings locally available to the ingress node. The NAT lease manager can monitor the pool and, when the pool is close to depletion, can reserve another block. These read operations are independent from packet process and form slow-path stateful functions of the ingress node.

When a packet is received by the ingress node and the corresponding agent determines a match to a NAT rule, the NAT lease manager selects a locally available mapping. The mapping is stored in a flow state and the flow state is written to a local NAT mapping table. The agent modifies the packet according to the selected NAT information. Next, a metadata exchange can occur. Specifically, the agent generates a control packet and tunnels the control packet to an egress node. The control packet contains the selected mapping. The egress node writes the mapping to an associated local NAT mapping table upon receipt of the control packet. The modified forward packet is tunneled to the egress host. According to an example, the ingress node can maintain the mapping in a hash table data structure. Lookups and expirations can be performed according to a similar policy utilized in connection with the shared database, but on a local level.

For a return packet, processing again does not result in any read or write operations to a shared database. Here, a packet is received by the egress node and the agent determines the packet matches a reverse NAT rule. The NAT lease manager module queries the local table of mappings and retrieves the mapping previously stored as a result of the control packet. The packet is modified in an inverse manner to the forward direction and tunneled to the ingress node In an aspect, the ingress and egress nodes can periodically exchange control packets in order to perform key refreshes. Alternatively, an expiration time for mappings in the table can be made suitable long to avoid premature connection breaks.

Similar to the NAT scenario, connection tracking for the forward packet does not incur any I/O cost to the shared database. A packet is received at an ingress host and the agent determines a rule is matched. A local tracking table is queried for a corresponding connection tracking key. In this example, the query misses and a new entry is written to the table. As with the NAT scenario, the agent generates a control packet and tunnels the control packet to an egress node. The control packet contains the tracking key. The egress node writes the key to an associated local tracking table upon receipt of the control packet. The ingress node tunnels the packet to the egress node.

For the return packet, the packet is received by the egress node and the agent determines that a rule is matched. The local tracking table is queried and the connection tracking key is returned. Here, the connection tracking key is written to the local tracking table upon receipt of the control packet described above. Thus, connection tracking for the return packet also does not incur I/O costs associated with the shared database.

Various features are apparent from the foregoing that represent modifications to the general system architecture described above.

First, one or more associative data structures (e.g. tables) holds the local L4 state for each node. These structures can be segregated by state type (e.g., NAT mapping and connection tracking metadata) and indexed by a set of ports. The set of ports can include the ingress port, all the egress ports, and members of the same stateful port groups. The tables should be accessible throughout the simulation as operations on the tables replace read/write operations to the shared database. In association with the tables, a holding mechanism is provided to hold new entries that will be written into the tables and distributed across peers.

Next, for NAT mappings, a random target mapping should be generated. Independently, or asynchronously to the mappings, the shared database can be utilized for coordination or for reservations of blocks of mappings.

Another feature is the distribution of the layer 4 state. For instance, when emitting a packet that generated stateful table entries locally, the agent will tunnel the entries to the egress host. When the egress host receives the metadata, it writes in the table associated with the egress port. In an example, a specific bit of a tunnel key can be set to signal connection tracking as opposed to sending explicit metadata information in a payload.

Another aspect related thereto is support for port groups. Metadata messages are sent to peers in a port group (e.g., a set of (port, host) pairs). Port groups are managed according to a configured mapping of virtual elements to physical elements. Upon finishing a simulation that introduced state information that needs to be shared (and when sending a metadata message to the egressing host with this state information), it is determined if the egressing and/or ingressing ports are part of a port group. If so, the state information is also pushed to the different hosts in the port groups. The metadata can be tunneled using a specific tunnel key or it can be an UDP message.

An application program interface (API) is provided by the general system architecture to enable configuration of the virtual network, virtual devices, overlay mappings, etc. The API has endpoints for port group configuration and writes the configuration to a distributed configuration service (e.g. Zookeeper). The agent watches for changes to the groups to which local ports belong, and updates the local in-memory data structures accordingly.

Virtual machine (VM) migration is supported. Replicas of all port-scoped data structures can be retained in the shared database. Accordingly, this involves writing the connection tracking sets and the NAT maps to the shared database asynchronously and out of the simulation path. An entry can be indexed both by ingressing port and egressing port to enable efficient querying. Upon discovering a new port binding, a host queries the shared database for data structures indexed by that port. If non-empty, the host seeds the port's connection tracking set and NAT map with the data returned by the query.

In addition, invalidation of ingressing host flows is also provided. Upon discovering a new port binding, a host queries the shared database for data structures indexed by that port. If non-empty, then for all peers that may have flows installed that send traffic to the previous host that bound that port, the current host sends messages so the peers can invalidate those flows.

According to the general system architecture described above, the agent executed by a processor on each physical host provides per-flow L4 state which is stored in a shared database (e.g., a distributed data management system such as Cassandra). Agents typically query the shared database every time a piece of topology requires state information while simulating a packet. Further, writes to the shared database also happen in a blocking fashion in line with the simulation.

In general, few hosts are ever interested in a particular piece of state information. Further, those hosts can be determined in advance. In order to maintain as much data in memory so as to process flows without the querying the shared database, peer-to-peer metadata exchange is utilized. Thus, when an agent creates a piece of state information, the agent pushes the information to other agents of the hosts known in advance. These hosts may utilize the state information to simulate return flows or process forward flows coming in through a different host than an originator.

With metadata exchange, stateful layer 4 processing is performed locally without reliance on external systems. Thus, user-visible latency and throughputs similar to those of L2, L3 or L4-stateless flows. In addition, cluster components (e.g., components of the shared database) can be removed from an agent's packet processing fast path. This enables stateful processing by an agent even while discounted from the cluster. Further, packet processing becomes 100% synchronous and non-blocking.

With disconnected packet processing, the shared database cluster will take no direct part in the packet processing fast path. The shared database is utilized a backup for keys for port migration. The improved system does not rely on it for solutions for any of the other requirements. Because of this, there is no difference in latency vs stateless processing. This is the main advantage of this design, though there are other advantages. As a result, latency in Layer 4 flow processing must be similar to stateless packet processing.

In addition, NAT leases will continue to provide the same properties as with the general system architecture. The system enables guarantees of no key collisions even for flows processed at the same time on different hosts. For example, a dummy random lease manager that does not consider collisions can be utilized. The lease manager is local and remains so. Collisions are unlikely as every element of the source-port:source-ip:dest-ip:dest-port quad-tuple would have to be part of the collision. In another example, a NAT lease manager module can be configured as follows. When a lease is requested for the first time, the simulation is cancelled or put on hold. The NAT lease manager module reserves a group of ip/ports from the shared database. Additional reservations can be made as needed (i.e. the reserve supply exhausts). Once leases are locally available following reservation, allocation will become instant and purely local (i.e. without calls to an external system). Reserved leases can be returned (i.e. unreserved) after a time interval of zero-usage.

When an instance of state information expires, return flows in egress hosts disappear in after period of time. With the general system architecture, such flows have a hard-time expiration and re-simulation will not find data in the shared database. To preserve the guarantee, egress hosts must converge, after topology changes or other state expiration event, in a bounded amount of time.

All flows are tagged with the state (e.g., NAT or connection tracking) keys referenced. The host that owns a key will push delete-state messages when the key is removed. Every host, upon deleting a key, will invalidate flows that use the key as a tag. Generally, keys do not expire until an associated reference count is zero. However, if a key is deleted because the owner-host requests deletion, associated flows are invalidated immediately.

In one embodiment, fire-and-forget state-push messages are exchanged between hosts. As an undelivered message results in a broken connection, a reliable delivery protocol can be utilized with underlying networks experiencing high packet loss rates. To illustrate, consider an ingress node that receives a SYN, emits the packet, installs a flow, and pushes state information. Should the state information be dropped (e.g., not delivered) to an egress node, return packets are not matched with the state information and a drop flow is created. A number of retries for SYN packet delivery varies depending on an operating system installed on the node executing the agent. Other than tolerating occasional broken connections, an ACK-based protocol can be introduced. The ingress node expects and tracks ACKs for all the state-push messages (e.g. state information) emitted. State information is retransmitted if ACKs are not received. As described above, flows are tagged with the associated keys. With missing state information, flows are tag with a null value. Upon retransmission of state information, and successful receipt, the egress node observes the key is new to the local state table. Accordingly, all flows tagged with the null value are invalidated. The return flow will properly occur with the state information, thus healing the connection. According to another example, a TCP transport can be utilized to push state information. A connection manager is utilized as well as the null tagging and invalidating technique described above.

Due to asymmetric routing, return flows may come into the cloud through a different host or hosts than the original egress host. All of these hosts need to be aware of the relevant state to calculate return flows correctly. The stateful port group described above addresses asymmetric routing situations.

When a port migrates, relevant state information migrates as well so as to not break connections. After a port migrates, hosts that did not own the port, but had flows pointing to the port, invalidate any relevant flows.

State information expiration happens naturally after a time interval from the time the host that owns a key stops refreshing the key. Key refresh halts when all the flows that were referencing a key have been removed.

To enable per-flow state key replication, at least four types of hosts keep local copies of the state associated with a given flow: the ingress host, the egress host, hosts that own ports in the same port group as the ingress port (referred to collectively as ingress hosts), and hosts that own ports in the same port group as the egress port (referred to collectively as egress hosts).

Hosts participating in a flow can have either strong or weak references to the state of that flow. Ingress hosts strongly reference the flow state, meaning that they contribute towards that state's reference count. A given piece of state can be eliminated from the distributed system when no ingress host references it. Egress hosts reference the state, but do not count towards its reference count. Egress hosts remain observers because, for security reasons, only ingress hosts react to changes in the topology that impact the flow.

To avoid coordination among hosts, some strong references are transformed to weak references. Ingress hosts are divided in two groups: (1) the host that generated a given key, referred to as the originator; and (2) the remaining ingress hosts. The non-originator hosts behave like egress hosts and hold weak references instead of strong references. Accordingly, two types of participants are present: the originator and everyone else. Here, everyone else is referred to as the receiving hosts. Receiving hosts include all non-originating hosts plus all egress hosts.

Based on these designations, different responsibilities of each type are described with reference to different events. At key creation time, the originator host pushes the key to all receiving hosts and tracks pushed state information in a port=>keys=>peers two-level map. At key creation time, receiving hosts install the key, set the reference count to 1, maintain sender=>key and ingressPort=>key associations, and set the reference count to zero if the sender is offline, the port does not belong to the sender, or the sender's epoch is too old.

When a flow is simulated that hits the key (e.g., a key having an ingress port is owned by the originator host), the originator host recalculates participants and pushes the key again. For example, the list of interested hosts is the union of the lists of hosts the key was pushed to the first time and those it was pushed to the second time. The local reference count for the key is incremented. Here, the receiving hosts take no action.

When a key is retrieved from a shared database (e.g. on boot or at port-binding time), the originator host imports the key with a reference count set to zero. The originator host claims ownership of the key when a new flow hits the key. Responsive to this event, the receiving hosts install the key with a reference count of zero.

When an ingress port owned by the originator host migrates to another host, the originating host drops ownership by forgetting the key→hosts associations for that port. The receiving hosts set the reference count to zero. The receiving hosts will subsequently return the reference count to one if the new owner receives traffic and resends. A similar action is taken by the receiving hosts when the originator host goes offline.

When a key expires, the originator host delete the key locally and pushes a deletion message to the hosts that received the key. When thee set of ports in a participating port group changes or a port that belongs to a participating port group changes hosts, the originating host invalidates flows that reference keys using that port group as ingress or egress.

Table 1 provided below summarizes the responsibilities described above for the various events:

| Event | Originator | Recipients |
|---|---|---|
| Key creation | Push to recipients Tag flow with port-group, port-set, port for ingress and egress. | — |
| Key ref( ) | If the key's ingress port is owned locally: Recalculate new recipients and push Increment local ref count Tag flow with port-group, port-set, port for ingress and egress. | The key's ingress port is not owned locally: Do nothing. Keep ref count as it was (zero or one). |
| Local port binding discovered | Fetch keys from shared database Set ref count to zero | — |
| Local port binding lost | Forget recipients (drops ownership) | — |
| Key idles out | Delete key locally Push deletion to all recipients | Delete key locally |
| Port group updated | Invalidate flows that used the port group in recipient calculation | Do nothing. |
| Port set updated | Invalidate flows that used the port set in recipient calculation. | Do nothing. |
| ingress Port.hostID updated | Invalidate flows that used the port in recipient calculation | Set key refcount to zero. |
| Key received | — | Import key Set refcount to one. If the known host's epoch is larger than the packet's: Set refcount to zero. |
| Originator goes offline or its epoch gets updated | — | Set key refcount to zero |
| egress Port.hostID updated | Invalidate flows that used the port in recipient calculation | Do nothing |

According to an exemplary, non-limiting embodiment, an agent is installed on one or more physical hosts. Physical hosts run hypervisors that are connected by a network—the underlay. Virtual machines running on these hosts are themselves connected by an overlay network comprised of virtual, fully distributed network devices (e.g. ports, bridges, routers, load balancers, firewalls, etc.). The set of virtual network devices is referred to as the virtual topology.

The agents of the physical hosts implements a network overlay to construct a virtual topology comprised of devices. When a packet ingresses the virtual topology, it is simulated by an agent running on a host. This host is referred to as the ingress host. A packet can ingress the virtual topology, for example, by coming into the cloud from outside or by being emitted by a virtual machine. After being simulated, if the packet is not dropped or consumed, it will be emitted towards the egress host, where the destination virtual machine resides. For the particular case of two communicating VMs residing in the same host, the ingress and egress hosts are the same. The endpoints of the virtual topology—a virtual machine, a LXC container, a physical interface, etc.—are modeled as virtual ports that are bound to the physical hosts running the agent. These bindings may change as a consequence of events such a virtual machine migration, whereby the port becomes bound to a different host.

A flow is a unidirectional stream of packets going from a sender to a particular destination. Flows are identifiable by the characteristics of the underlying packets, namely the headers. In a connection—two flows in opposite directions—one flow is the forward flow and other is the return flow, with the forward flow being the originator of the connection. Typically, a bounded number of hosts participate in a flow or connection and this number seldom changes for the duration of the connection. This number of hosts includes at least the ingress host and the egress host of a packet traversing the virtual topology, with the roles reversing with the direction. If the flow is mirrored to another host or diverted through a middle box, then these hosts also participate in the flow. When there are multiple ports through which the packets of a flow can ingress or egress the virtual topology, due to asymmetric routing in the underlay, the hosts on which all of those ports are bound also participate in the flow.

Each flow or connection can potentially have a state associated therewith. For example, this state can be connection tracking metadata, NAT mappings, traffic classification metadata, etc. All hosts participating in a flow have access to this state. For example, a host processing a packet in the return flow may reverse a NAT. Further, all hosts through which a packet can ingress must be able to access the same classification metadata.

Most flow state is connection state. For some instances of flow state, the return flow state can be calculated by a host processing the forward flow. Thus, return flow state should be available. Return flow state is subordinate to the presence of forward flow state, with a lifecycle matching that of the forward flow state.

During processing of a packet, all hosts participating in the flow become known. New flow state information is generated during that processing. On one implementation, the new flow state information might be communicated, as one or more control packets, to the interested hosts before sending the actual data packet. As described above, the underlay can be configured to support lossless delivery of the control packets. The state information includes data to identify the flow. For example, NAT state information can include the 5-tuple of the flow and an identifier of the device that applied the NAT.

Hosts participating in a flow can have either strong or weak references to the state of that flow. Ingress hosts strongly reference the flow state, meaning that they contribute towards that state's reference count. A given piece of state can be eliminated from the distributed system when no ingress host references it. Egress hosts reference the state, but do not count towards its reference count, as do other hosts that have a copy of that flow state.

According to an embodiment, advanced network services make per-flow decisions that are preserved for the duration of the flow. For example, IPv4 port-masquerading (NAPT) chooses a free public IP:port pair to replace the private IP:port pair in a TCP/UDP packet sent from a client in the cloud to a server on the internet. Traditionally, this per-flow state could live in a single location, e.g. a network device. Both forward and return flows traversed the same device allowing reverse translation in the case of port-masquerading, or connection-status-based filtering in the case of a stateful firewall.

As such, the single location becomes a single point of failure. To alleviate this concern, network device share session state between a fault-tolerant pair or among a cluster of load-balancers.

Per-flow state sharing at multiple nodes enables several advantages. For instance, it enables avoidance of forwarding an overlay flow to an intermediate hypervisor or network device to reach a stateful network service like load-balancing and firewalling. In addition, when flows traverse L2 and L3 gateways, sharing per-flow state supports asymmetric return paths and promotes gateway node fault tolerance.

As described above, the agent in the general system architecture, executing on an ingress node that receives a flow, simulates how the flow traverses the overlay network to determine whether the packet is dropped or to determine the virtual device and port where the packet egresses the overlay network. The agent maps the egress virtual port to a physical node and establishes fast-path pattern matching, modifying, encapsulating, and tunneling the flow to the computed egress node. In the general configuration of the general system architecture, a distributed database (e.g., Cassandra) was used to store any flow state created or utilized during computation of the flow's traversal of the overlay network. This state could answer these questions: (1) is this a forward or return flow; (2) in what state is this TCP connection; (3) where should load-balancer LB1 send this flow; (4) what Public source IPv4 address and TCP port would this port-masquerading instance select; or (5) what private source IPv4 and TCP port is being masked by this public IPv4 address and TCP port. Other uses for state information are contemplated.

Figure 9:
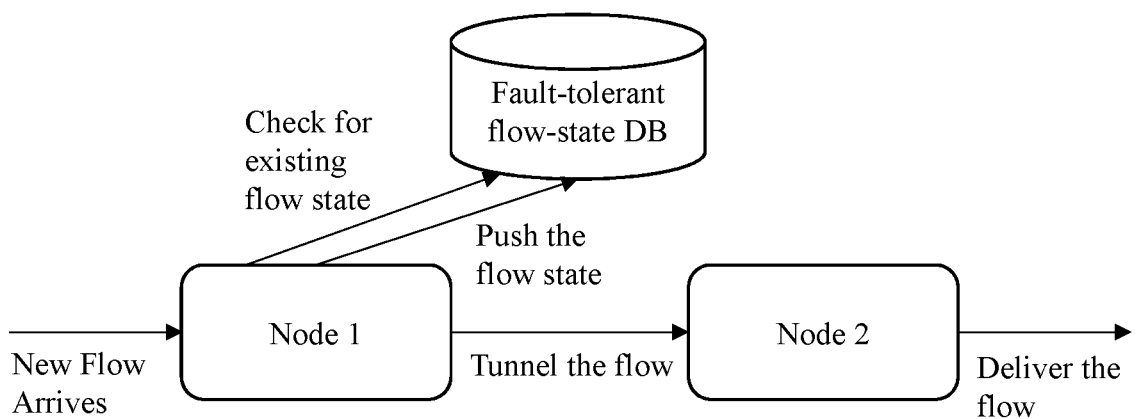
FIG. 9 illustrates a first aspect of flow state management with a shared database.
Figure 11:
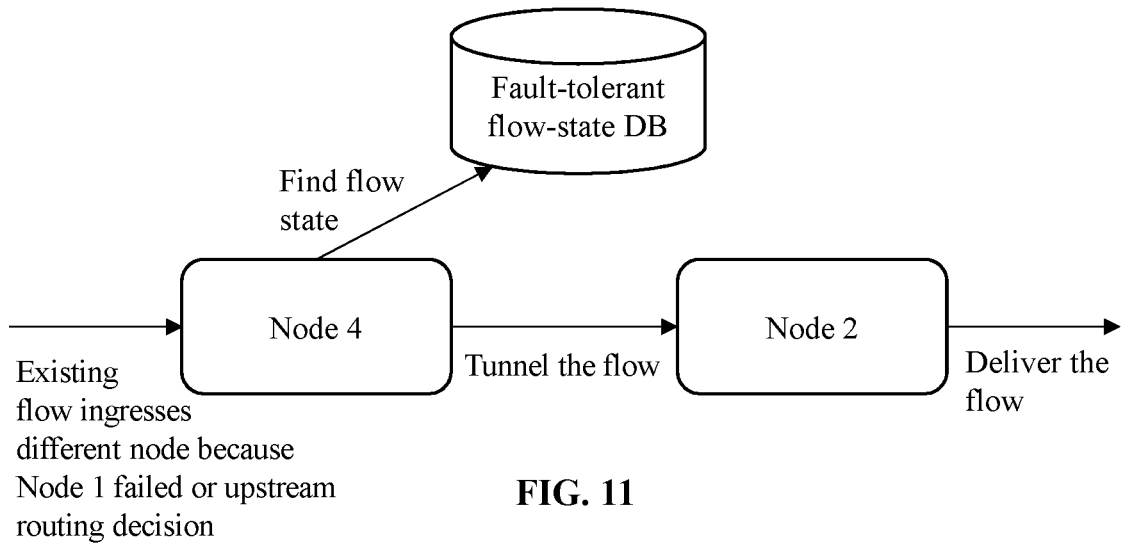
FIG. 11 illustrates a third aspect of flow state management with a shared database.

FIGS. 9-11 illustrate flow state management with a shared database. As shown in FIG. 9, for a new flow, the ingress node (Node 1) performs two round-trips to the flow-state database. One database access checks for an existing state (i.e. detect whether it was a new flow) and the other database access stores the newly created flow-state.

As shown in FIG. 10, for the return flow, an ingress node for the return flow (either Node 2 from the forward flow or some Node 3 if the return path is asymmetric) retrieves the flow state from the flow state database, computes the return flow, and tunnels the flow to Node 1 (or perhaps some Node 4 if the return path terminates with some ECMP routes).

FIG. 11 illustrates the scenario where the forward flow ingresses some Node 4 (because of upstream ECMP routing) or an amnesiac Node 1, the ingress node is able to find the flow state in the database and correctly compute the flow in order to tunnel the flow to Node 2.

Figure 12:
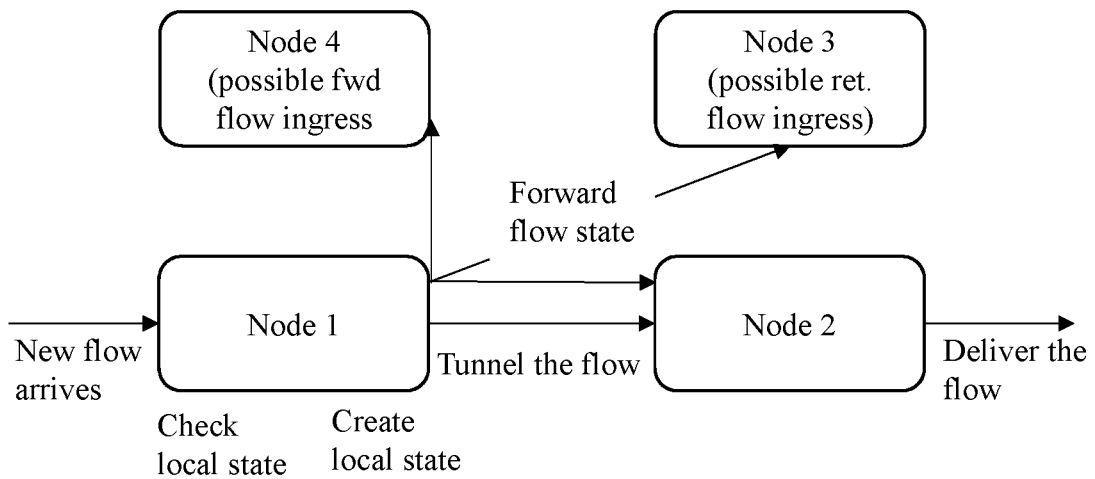
FIG. 12 illustrates a first aspect of flow state management with state pushing.
Figure 13:
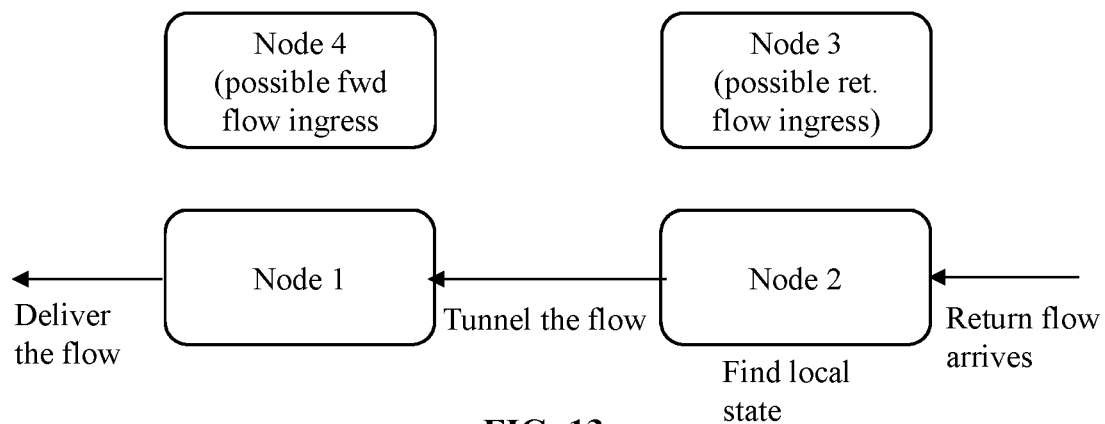
FIG. 13 illustrates a second aspect of flow state management with state pushing.
Figure 14:
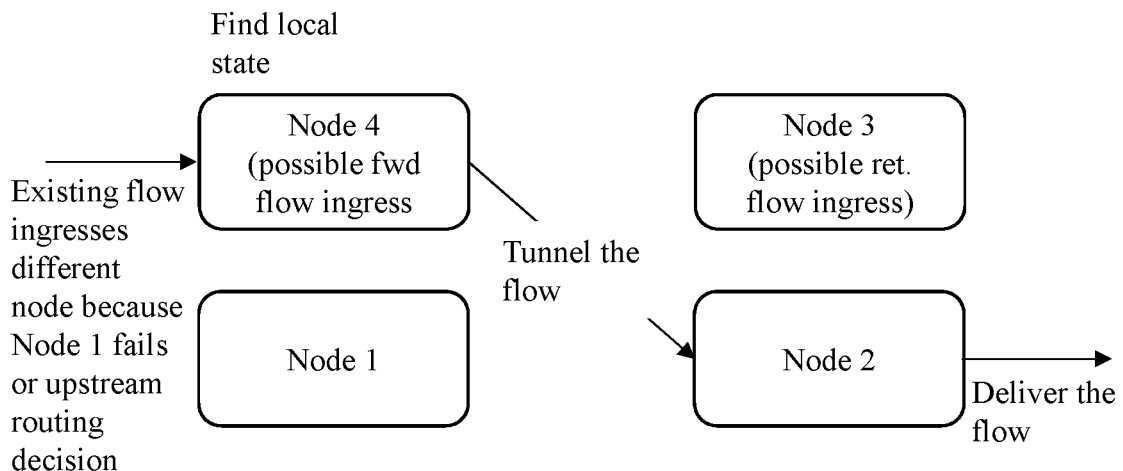
FIG. 14 illustrates a third aspect of flow state management with state pushing.

FIGS. 12-14 illustrate flow state management and network operation when state pushing is utilized (i.e. when the ingress node pushes the flow state directly to an interested set of nodes). As shown in FIG. 12, the ingress node for a new flow can determine the set of nodes (e.g., the interested set) that should have access to the state information and push the state information to those nodes.

For a new flow that ingresses Node 1, the ingress node queries a local state table and identifies the flow as a new flow. The node performs flow computation during which flow state is created and stored locally. The node determines the interested set of nodes and pushes the flow state to the nodes of the set. As shown in FIG. 12, the interested set includes Node 1, Node 2, Node 3, and Node 4, where Nodes 1 and 4 are potential ingresses for the forward flow and Nodes 2 and 3 are potential ingresses for the return flow.

For the return flow ingressing at Node 2, the node queries a local store to retrieve the flow state. As shown in FIG. 13, the return flow is then tunneled to Node 1. When a forward flow ingresses a different node (e.g. Node 4) as shown in FIG. 14, the ingress node queries a local store to retrieve the flow state and tunnels the flow accordingly. As the flow state was previously pushed to Node 2 and Node 4, the above scenarios do not require access to a share database management system.

Flow state, in one embodiment, is communicated via a tunnel packet with a special-value tunnel key indicating the packet include state information. The packet can be sent unreliably (e.g., fire-and-forget) from ingress to egress before related data packets. However, as described above, a reliable protocol can also be utilized to transmit the packet.

The interested set can be hinted at by various information known beforehand. For instance, depending on upstream routes, any of the static or dynamic uplinks of a provider router may receive a north-to-south flow. Accordingly, the uplinks of the provider router should be added to a single ingress set. Similarly, a tenant may have a redundant L3 VPN from their office network to their tenant router. The tenant's VPN traffic may ingress the virtual network at more than one node.

Further, a VLAN L2 Gateway allows 2 physical links into an 802.1Q virtual bridge. Depending on STP, traffic from the physical workloads can ingress either of the 802.1Q bridge's uplink ports. The VXLAN L2 Gateway allows any node to tunnel traffic directly to a physical VTEP. The traffic is forwarded to the set of port/vlan pairs associated with the VNI. The physical vtep forwards on-virtual-switch traffic directly to a host that is local to the destination MAC. For on-virtual-switch traffic, only forward ingress sets for traffic headed to the VTEP are considered along with return ingress sets for traffic coming from the VTEP.

Port migration facilitates VM migration. With state-push as opposed to a shared database approach, flow computation at the new node works as described above. However, for a few seconds after the port has migrated, flows will not find local state information and flow computations are performed incorrectly. However, the agent on the new node pulls all related flow state information from the old node. Flow state is indexed (and laid out contiguously in memory) by ingress port, and can be transferred from old node to new node quickly.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
a communication interface configured to couple the computing device to a network; and
a processor coupled to a non-transitory, computer-readable storage medium having stored thereon computer-executable instructions for a virtual network agent that routes data packets using a virtual network overlaying an underlying network, the virtual network agent, when executed by the processor, configures the processor to:
reserve a block of addresses from a shared database to establish a pool of locally available network address translation mappings;
determine whether a communication flow associated with a data packet received at the first communication interface is a new flow; wherein the communication flow comprises a plurality of data packets received at the first communication interface which are to be delivered to a destination node associated with the communication flow;
generate state information for the communication flow when the communication flow is determined to be a new flow;
generate a control packet that includes the state information for the communication flow, wherein the control packet comprises a locally available network address translation (NAT) mapping from the pool;
after generating the control packet, tunnel the control packet to the destination node associated with the communication flow; and
after tunneling the control packet, transmit the data packet to the destination node,
wherein the computing device provides a peer-to-peer exchange of the control packet for the communication flow.

2. The computing device of claim 1, wherein the destination node is a second computing device communicatively coupled to the computing device via the underlying network.

3. The computing device of claim 1, wherein the virtual network agent further configures the processor to identify the communication flow as a new flow by querying a local data store based on information extracted from the data packet.

4. The computing device of claim 3, wherein the information extracted includes an ingress port at which the data packet is received.

5. The computing device of claim 3, wherein the local data store comprises an associative data structure stored on the non-transitory, computer-readable storage medium.

6. The computing device of claim 3, wherein the virtual network agent further configures the processor to write the state information generated to the local data store.

7. The computing device of claim 1, wherein the virtual network agent further configures the processor to simulate traversal of the data packet through the virtual network based on a virtual network topology.

8. The computing device of claim 7, wherein the virtual network topology specifies a graph of virtual nodes of the virtual network and mapping of respective virtual nodes to physical nodes of the underlying network.

9. The computing device of claim 7, wherein the virtual network agent further configures the processor to retrieve the virtual network topology from a distributed database management system and to locally cache the virtual network topology to the non-transitory, computer-readable storage medium.

10. The computing device of claim 7, wherein a result of the simulated traversal includes at least one of a decision to drop the data packet or an identification of the destination node as an egress node of the virtual network.

11. The computing device of claim 1, wherein the state information includes a network address translation mapping that modifies at least one of a source field or a destination field of the data packet.

12. The computing device of claim 1, wherein the virtual network agent further configures the processor to:
   generate a second control packet indicating a request to delete the state information; and
   send the second control packet to the destination node to effect deletion of the state information.

13. The computing device of claim 1, wherein the virtual network agent further configures the processor to:
   receive a third control packet from a second node of the underlying network;
   extract second state information included in the third control packet; and
   write the second state information to a local data store.

14. The computing device of claim 1, wherein the virtual network agent further configures the processor to send the control packet in accordance with a reliable delivery protocol.

15. The computing device of claim 1, wherein the destination node is a single egress node of the virtual network.

16. The computing device of claim 1, wherein the processor is further configured to refrain from transmitting the control packet to a shared database prior to tunneling the control packet to the destination node associated with the communication flow.

17. The computing device of claim 1, wherein the processor is further configured to refrain from transmitting the control packet to other destination nodes of the virtual network that are not associated with the communication flow before tunneling the control packet to the destination node associated with the communication flow.

* * * * *